United States Patent
Otaka

(10) Patent No.: US 7,876,371 B2
(45) Date of Patent: Jan. 25, 2011

(54) SYSTEMS AND METHODS TO PERFORM DIGITAL CORRELATED DOUBLE SAMPLING USING SUCCESSIVE APPROXIMATION ANALOG TO DIGITAL CONVERSION TECHNIQUES

(75) Inventor: Toshinori Otaka, Chiba (JP)

(73) Assignee: Aptina Imaging Corporation, George Town (KY)

( * ) Notice: Subject to any disclaimer, the term of this patent is extended or adjusted under 35 U.S.C. 154(b) by 492 days.

(21) Appl. No.: 12/060,093

(22) Filed: Mar. 31, 2008

(65) Prior Publication Data

US 2009/0244334 A1    Oct. 1, 2009

(51) Int. Cl.
*H04N 3/14*    (2006.01)
*H04N 5/335*   (2006.01)

(52) U.S. Cl. .................................. 348/294; 348/222.1

(58) Field of Classification Search .............. 348/222.1, 348/231.99, 241, 294, 308
See application file for complete search history.

(56) References Cited

U.S. PATENT DOCUMENTS

| | | | |
|---|---|---|---|
| 5,877,715 A * | 3/1999 | Gowda et al. ................ 341/122 |
| 6,858,827 B2 | 2/2005 | Sugiyama et al. | |
| 6,903,670 B1 | 6/2005 | Lee et al. | |
| 7,002,628 B1 | 2/2006 | Panicacci | |
| 7,015,844 B1 | 3/2006 | Boemler | |
| 7,129,978 B1 | 10/2006 | Brehmer et al. | |
| 7,227,490 B2 | 6/2007 | Kawahito | |
| 2003/0058346 A1 * | 3/2003 | Bechtel et al. ......... 348/207.99 |
| 2003/0202111 A1 * | 10/2003 | Park ........................... 348/243 |
| 2006/0220940 A1 | 10/2006 | Oh | |

FOREIGN PATENT DOCUMENTS

| | | |
|---|---|---|
| EP | 1 753 226 A1 | 2/2007 |
| WO | WO 2004/073296 A1 | 8/2004 |

OTHER PUBLICATIONS

Morris, T. et al., "A Column-Based Processing Array for High-Speed Digital Image Processing", Intel Corp., *Advanced Research in VLSI*, 20th Anniversary Conference, Mar. 21-24, 1999, pp. 42-56.

Toyama, T. et al., "High Speed Digital Double Sampling with Analog CDS on Column Parallel ADC Architecture for Low Noise CMOS Image Sensor", ITE Technical Report vol. 30, No. 25, Mar. 2006, pp. 17-20.

Yang, W. et al., "An Integrated 800×600 CMOS Imaging System", ISSCC 99, WA 17.3, 1999, pp. 256,257,304,305.

* cited by examiner

*Primary Examiner*—Gevell Selby

(57) ABSTRACT

An imager includes a successive approximation analog-to-digital converter (SA-ADC) and an arithmetic memory. The successive approximation analog-to-digital converter converts analog representations of pixel reset and image signals for a pixel to digital representations of the pixel reset and image signals. The arithmetic memory generates a difference signal that represents the difference between the digital representations of the pixel reset signal and the pixel image signal using a most-significant-bit-first (MSB-first) calculation.

22 Claims, 19 Drawing Sheets

Adding: Example 1

+14 + (-3) = +11

|   | LSB |   |   | MSB | OVF | S |   |
|---|---|---|---|---|---|---|---|
| B\A | 0 | 1 | 1 | 1 | 0 | 0, |   |
| 1 | 1, | 0 | 1 | 1 | 1 | 0 |   |
| 1 | 1 | 1, | 0 | 1 | 1 | 1 |   |
|   | Put 0 | Inv | Inv | Don't Inv |   |   | ← C |
| 1 | 0 | 0 | 0, | 0 | 1 | 1 |   |
|   | Put 0 | Inv | Stop Inv |   |   |   | ← C |
| 1 | 0 | 1 | 0 | 0, | 0 | 1 |   |
| 0 | 1 | 0 | 1 | 0 | 0, | 0 |   |
| 1 | 1 | 1 | 0 | 1 | 0 | 0, | = +11 (OK) |

Adding: Example 2

+14 + (-10) = +4

|   | LSB |   |   | MSB | OVF | S |   |
|---|---|---|---|---|---|---|---|
| B\A | 0 | 1 | 1 | 1 | 0 | 0, |   |
| 1 | 1, | 0 | 1 | 1 | 1 | 0 |   |
| 1 | 1 | 1, | 0 | 1 | 1 | 1 |   |
| 0 | 1 | 1 | 1, | 0 | 1 | 1 | ← C |
|   | Put 0 | Inv | Inv | Inv | Don't Inv |   |   |
| 1 | 0 | 0 | 0 | 0, | 0 | 1 | ← C |
|   | Put 0 | Inv | Stop Inv |   |   |   |   |
| 1 | 0 | 1 | 0 | 0 | 0, | 0 |   |
| 0 | 0 | 0 | 1 | 0 | 0 | 0, | = +4 (OK) |

Adding: Example 3

+14 + (-15) = -1

|   | LSB |   |   | MSB | OVF | S |   |
|---|---|---|---|---|---|---|---|
| B\A | 0 | 1 | 1 | 1 | 0 | 0, |   |
| 1 | 1, | 0 | 1 | 1 | 1 | 0 |   |
| 1 | 1 | 1, | 0 | 1 | 1 | 1 |   |
| 0 | 1 | 1 | 1, | 0 | 1 | 1 |   |
| 0 | 1 | 1 | 1 | 1, | 0 | 1 |   |
| 0 | 1 | 1 | 1 | 1 | 1, | 0 |   |
| 1 | 1 | 1 | 1 | 1 | 1 | 1, | = -1 (OK) |

Adding: Example 4

+1 + (-12) = -11

|   | LSB |   |   | MSB | OVF | S |   |
|---|---|---|---|---|---|---|---|
| B\A | 1 | 0 | 0 | 0 | 0 | 0, |   |
| 1 | 1, | 1 | 0 | 0 | 0 | 0 |   |
| 1 | 1 | 1, | 1 | 0 | 0 | 0 |   |
| 0 | 0 | 1 | 1, | 1 | 0 | 0 |   |
| 1 | 1 | 0 | 1 | 1, | 1 | 0 |   |
| 0 | 0 | 1 | 0 | 1 | 1, | 1 |   |
| 0 | 1 | 0 | 1 | 0 | 1 | 1, | = -11 (OK) |

FIG. 4

Subtracting: Example 1

+14 - (+3) = +11

|   | A | LSB | | | MSB | OVF | S |
|---|---|---|---|---|---|---|---|
| B |   | 0 | 1 | 1 | 1 | 0 | 0, |
| 0 |   | 0, | 0 | 1 | 1 | 1 | 0 |
| 0 |   | 0 | 0, | 0 | 1 | 1 | 1 |
| 0 |   | 1 | 0 | 0, | 0 | 1 | 1 |
| 0 |   | 1 | 1 | 0 | 0, | 0 | 1 |
| 1 |   | 0 | 1 | 1 | 0 | 0, | 0 |  ← B
|   |   | Put 1 | Inv | Inv | Stop | Inv | |
| 1 |   | 1 | 1 | 0 | 1 | 0 | 0, | = +11 (OK)

Subtracting: Example 2

+14 - (+10) = +4

|   | A | LSB | | | MSB | OVF | S |
|---|---|---|---|---|---|---|---|
| B |   | 0 | 1 | 1 | 1 | 0 | 0, |
| 0 |   | 0, | 0 | 1 | 1 | 1 | 0 |
| 0 |   | 0 | 0, | 0 | 1 | 1 | 1 |
| 1 |   | 0 | 0 | 0, | 0 | 1 | 1 |
| 0 |   | 1 | 0 | 0 | 0, | 0 | 1 |
| 1 |   | 0 | 1 | 0 | 0 | 0, | 0 |
| 0 |   | 0 | 0 | 1 | 0 | 0 | 0, | = +4 (OK)

Subtracting: Example 3

+14 - (+15) = -1

|   | A | LSB | | | MSB | OVF | S |
|---|---|---|---|---|---|---|---|
| B |   | 0 | 1 | 1 | 1 | 0 | 0, |
| 0 |   | 0, | 0 | 1 | 1 | 1 | 0 |
| 0 |   | 0 | 0, | 0 | 1 | 1 | 1 |
| 1 |   | 0 | 0 | 0, | 0 | 1 | 1 |
| 1 |   | 0 | 0 | 0 | 0, | 0 | 1 |
| 1 |   | 0 | 0 | 0 | 0 | 0, | 0 | ← B
|   |   | Put 1 | Inv | Inv | Inv | Inv | Inv |
| 1 |   | 1 | 1 | 1 | 1 | 1 | 1, | = -1 (OK)

Subtracting: Example 4

+1 - (+12) = -11

|   | A | LSB | | | MSB | OVF | S |
|---|---|---|---|---|---|---|---|
| B |   | 1 | 0 | 0 | 0 | 0 | 0, |
| 0 |   | 0, | 1 | 0 | 0 | 0 | 0 |
| 0 |   | 0 | 0, | 1 | 0 | 0 | 0 | ← B
|   |   | Put 1 | Inv | Inv | Don't Inv | | |
| 1 |   | 1 | 1 | 1, | 1 | 0 | 0 | ← B
|   |   | Put 1 | Inv | Stop | Inv | | |
| 1 |   | 1 | 0 | 1 | 1, | 1 | 0 |
| 0 |   | 0 | 1 | 0 | 1 | 1, | 1 |
| 0 |   | 1 | 0 | 1 | 0 | 1 | 1, | = -11 (OK)

FIG. 5

SYSTEMS AND METHODS TO PERFORM DIGITAL CORRELATED DOUBLE SAMPLING USING SUCCESSIVE APPROXIMATION ANALOG TO DIGITAL CONVERSION TECHNIQUES

TECHNICAL FIELD

Embodiments described herein relate generally to imaging and more particularly to digital correlated double sampling and associated analog to digital conversion techniques.

BACKGROUND

Solid state imagers reproduce an image by converting photons to signals that are representative of the image. In an imager, photosensors capture the photons and convert them to electrical charges which are read and used to represent the image. Each photosensor may include a photodiode, which is initially reset and then allowed to accumulate charges during an integration period. The accumulated charge is proportional to the light intensity of the image and may be represented by a pixel image voltage, $V_{sig}$. In complementary metal-oxide-semiconductor (CMOS) imagers, each pixel also produces a reset voltage, $V_{rst}$. CMOS imagers often perform correlated double sampling (CDS) to generate a pixel output signal representative of the difference between the pixel reset voltage $V_{rst}$ and the pixel image voltage $V_{sig}$. For example, one of the voltages may be subtracted from the other using an up-down counter, though this is generally possible only if the imager includes an integrating analog-to-digital converter (ADC), such as a single-slope analog-to-digital converter.

Single-slope analog-to-digital converters in a column parallel pixel array readout architecture have benefits such as reliable monotonicity and relatively simple circuits and controllers. However, single-slope analog-to-digital converters are also characterized by a relatively slow conversion speed, especially for high resolution applications. For a typical digital single lens reflection (DSLR) camera, a resolution of at least 12-14 bits is often necessary to effectively perform many image enhancement operations, such as tone reproduction, gamma correction, etc. The up/down counters of the single-slope analog-to-digital converters each count from 0 to 16383, which is $2^{14}-1$, to achieve 14-bit resolution. If the operating frequency of the single-slope analog-to-digital converters is 50 MHz, for example, one conversion takes approximately (16 k*1/50 MHz)=320 microseconds (μs) to complete. This is usually not acceptable for a DSLR application imager that requires a high frame rate for video output, such as 30 frames per second (fps). Moreover, digital correlated double sampling technology requires two analog-to-digital conversions, resulting in a total analog-to-digital conversion time of 640 μs, which is usually not acceptable. For example, 640 μs*2000 rows=1.3 seconds per frame, or 0.77 fps, which is much less than the 30 fps requirement mentioned above.

Digital correlated double sampling has superior characteristics over conventional analog correlated double sampling. Because the correlated double sampling is executed in the digital domain, noise which may be introduced by the correlated double sampling circuit may no longer exist. Because the differentiation operation is conducted after the all analog signal processing is executed (e.g., gain amplification, analog-to-digital conversion), the offset caused by the analog components can be corrected. The column fixed pattern noise associated with conventional correlated double sampling techniques requires embedded digital memory such as SRAM to store all column offset values to be subtracted. To enable a high frame rate and low noise level, a new digital correlated double sampling architecture that is suited to the fast analog-to-digital conversion mechanism is needed.

Thus, systems and methods are needed that address one or more of the aforementioned shortcomings of conventional correlated double sampling techniques using column parallel readout.

BRIEF DESCRIPTION OF THE DRAWINGS

FIG. 4 illustrates examples of a MSB-first addition of a digital pixel image signal and the two's complement of a digital pixel reset signal according to an embodiment described herein.

FIG. 5 illustrates examples of a MSB-first subtraction of a digital pixel image signal and a digital pixel reset signal according to an embodiment described herein.

In the drawings, like reference numbers indicate identical or functionally similar elements. Additionally, the leftmost digit(s) of a reference number identifies the drawing in which the reference number first appears.

DETAILED DESCRIPTION

Embodiments described herein subtract an imager's pixel reset signal $V_{rst}$ from the imager's pixel image signal $V_{sig}$ in the digital domain using digital numbers, rather than performing the subtraction in the analog domain as is conventional, and are particularly useful in CMOS imagers. The embodiments perform successive approximation analog-to-digital conversions of $V_{rst}$ and $V_{sig}$ in one row time to provide the digital representations of $V_{rst}$ and $V_{sig}$ (i.e., $DN_{rst}$ and $DN_{sig}$, respectively) in a most significant bit (MSB) first format. In other words, the bits of the digital representations $DN_{rst}$ and $DN_{sig}$ are provided in order from the MSB to the least significant bit (LSB) for processing. The embodiments are configured to effectively subtract $DN_{rst}$ from $DN_{sig}$ to generate a digital difference signal. For example, $DN_{sig}$ may be added to a two's complement of $DN_{rst}$ to generate the digital difference signal. In another example, $DN_{sig}$ may be subtracted from $DN_{rst}$ to generate an intermediate signal, which may then be processed using a two's complement algorithm to generate the digital difference signal. However, persons skilled in the relevant art(s) will recognize that the embodiments may be configured to effectively subtract $DN_{sig}$ from $DN_{rst}$ to generate the digital difference signal. For instance, if subtracting $DN_{rst}$ from $DN_{sig}$ results in a negative digital difference signal, it may be preferred to subtract $DN_{sig}$ from $DN_{rst}$ instead. The magnitude of the difference signal represents the image charges accumulated by the pixel photosensor.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
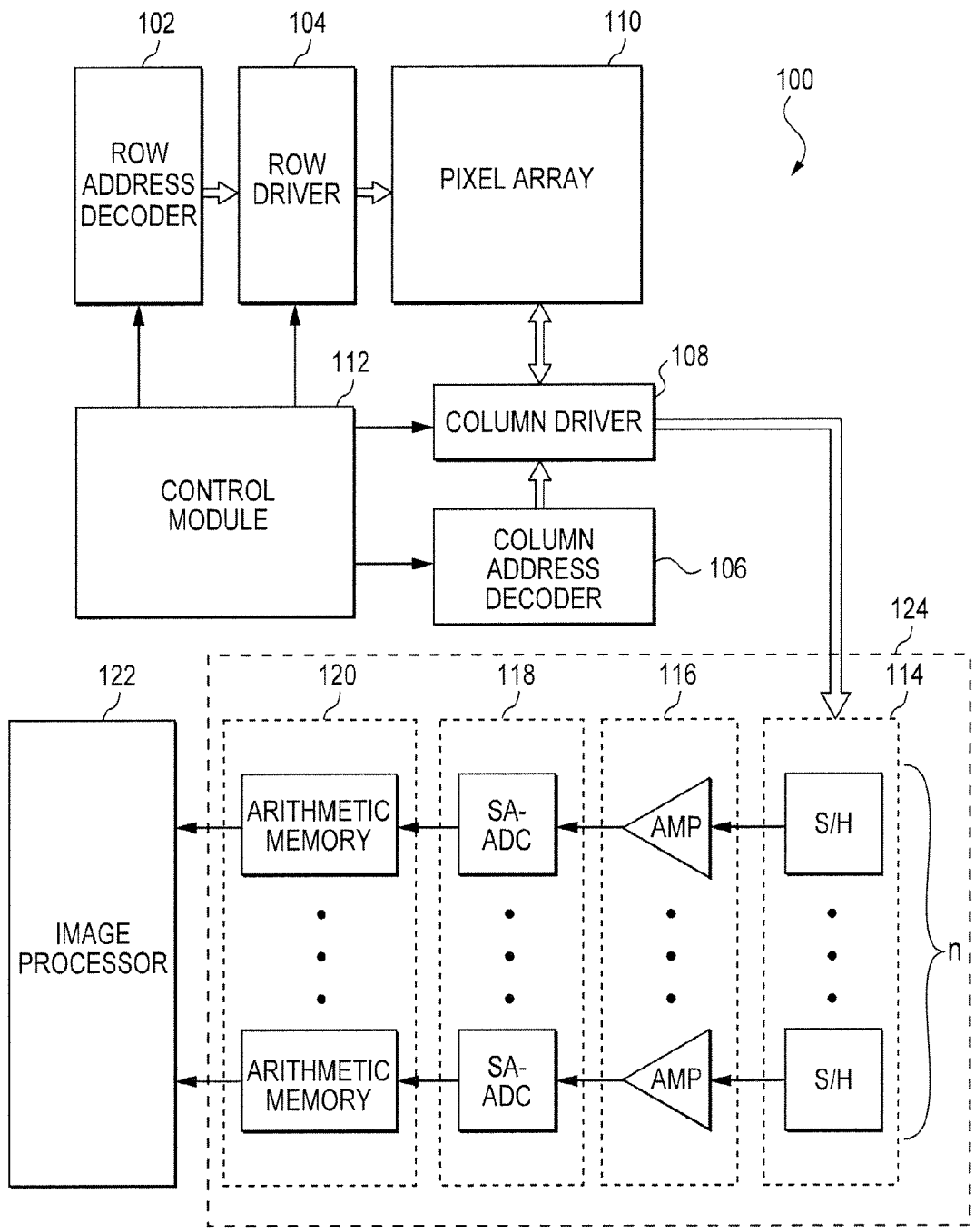
FIG. 1 is an example implementation of an imager in accordance with an embodiment disclosed herein.

FIG. 1 is an example implementation of an imager 100 in accordance with an embodiment disclosed herein. In FIG. 1, imager 100 is a CMOS imager, which includes a pixel array 110 having a plurality of pixels arranged in a predetermined number of columns and rows. The pixels in a given row of pixel array 110 are turned on at the same time by a row select line, and the pixel signals of each column are selectively provided to output lines by column select lines. A plurality of row and column select lines is provided for the entire pixel array 110.

Row driver 104 selectively activates the row lines in response to row address decoder 102. Column driver 108 selectively activates the column select lines in response to column address decoder 106. Thus, a row and column address is provided for each pixel in pixel array 110.

Control module 112 controls row address decoder 102 and column address decoder 106 for selecting the appropriate row and column select lines for pixel readout. Control module 112 further controls row driver 104 and column driver 108, which apply driving voltages to the respective drive transistors of the selected row and column select lines.

A digital correlated double sampling (CDS) module 124 performs digital CDS processing utilizing a pixel reset signal $V_{rst}$ and a pixel image signal $V_{sig}$ for selected pixels of respective columns of pixel array 110. Digital correlated double sampling module 124 includes a sample-and-hold (S/H) module 114, an amplifier module 116, a successive approximation analog-to-digital converter (SA-ADC) module 118, and an arithmetic memory module 120. Sample-and-hold module 114 is associated with column driver 108 and includes n sample-and-hold devices, which sample and hold the pixel reset signal $V_{rst}$ and the pixel image signal $V_{sig}$ for the selected pixels of pixel array 110. The variable n may be any integer and can represent the number of columns or a portion thereof (e.g., ½, ⅓, or ¼, etc. of the columns). Amplifier module 116 includes n amplifiers (amps), which amplify the sampled and held pixel reset $V_{rst}$ and pixel image $V_{sig}$ signals. Successive approximation analog-to-digital converter module 118 includes n successive approximation analog-to-digital converters, each of which digitizes the amplified pixel reset signal $V_{rst}$ and the pixel image signal $V_{sig}$ to provide digital representations thereof, denoted herein as $DN_{rst}$ and $DN_{sig}$, respectively. Arithmetic memory module 120 includes n arithmetic memories, each configured to effectively subtract the respective digital pixel reset signal $DN_{rst}$ from the respective digital pixel image signal $DN_{sig}$ using a MSB-first serial bit operation to generate a respective digital difference signal. The MSB-first serial bit operation may be a subtraction operation or an addition operation that includes a two's complement operation. Although the resulting digital difference signal is the same regardless which of these techniques is utilized, the computations performed by the arithmetic memories differ for each. These techniques are described in further detail below with reference to FIGS. 4 and 5.

An image processor 122 manipulates the digital difference signals received from the arithmetic memories to provide an output image color reproduction of an image captured by the plurality of pixels in pixel array 110. Image processor 122 may perform any of a variety of operations, including but not limited to positional gain adjustment, defect correction, noise reduction, optical crosstalk reduction, demosaicing, resizing, sharpening, etc. Image processor 122 may be on the same chip as imager 100, on a different chip than imager 100, or on a different stand-alone processor that receives a signal from imager 100.

In conventional column parallel analog-to-digital converter architectures, one sample-and-hold device, amplifier, and analog-to-digital converter may be provided for every two columns of a pixel array. One column pitch is equal to one pixel pitch, which may be for some imagers approximately 4.0 micrometers (μm), for example, for a digital still camera (DSC) application imager. In this example, the width of two columns is approximately 8.0 μm, which is roughly the size of one standard cell row height in the available logic process technology for CMOS imagers. The digital memory cells of the conventional architectures therefore should fit into this height, requiring a relatively simple circuit topology for the adder that is used to determine the differences between pixel reset signals and corresponding pixel image signals. Embodiments described herein are capable of performing a MSB-first addition or MSB-first subtraction operation serially while the unit cells fit within a double pixel pitch.

Each of the sample-and-hold devices, amplifiers, successive approximation analog-to-digital converters, and arithmetic memories shown in FIG. 1 may correspond with a respective column line of pixel array 110. For instance, pixel array 110 may have n column lines, each column line associated with a respective sample-and-hold device, amplifier, successive approximation analog-to-digital converter, and arithmetic memory of digital correlated double sampling module 124. However, this is merely one representative structure. A sample-and-hold device, amplifier, successive approximation analog-to-digital converter, and arithmetic memory may be assigned to any number of column lines. For example, one sample-and-hold device, amplifier, successive approximation analog-to-digital converter, and arithmetic memory may be provided for every two column lines, or every three column lines, etc. Other arrangements can also be provided using sample-and-hold devices, amplifiers, successive approximation analog-to-digital converters, and arithmetic memories for sampling and providing digital output signals for the pixels of array 110. For instance, digital correlated double sampling module 124 need not necessarily include the same number of sample-and-hold devices, amplifiers, successive approximation analog-to-digital converters, and arithmetic memories.

The sample-and-hold devices, amplifiers, and analog-to-digital converters of conventional column parallel analog-to-digital converter architectures are typically implemented along a first side (e.g., the bottom side) of a pixel array. Embodiments described herein are not limited in this respect. For example, some sample-and-hold devices, amplifiers, and successive approximation analog-to-digital converters of digital correlated double sampling module 124 may be implemented along a first side (e.g., the bottom side) of a pixel array, while others are implemented along a second side (e.g., the top side) of the pixel array.

Figure 2:
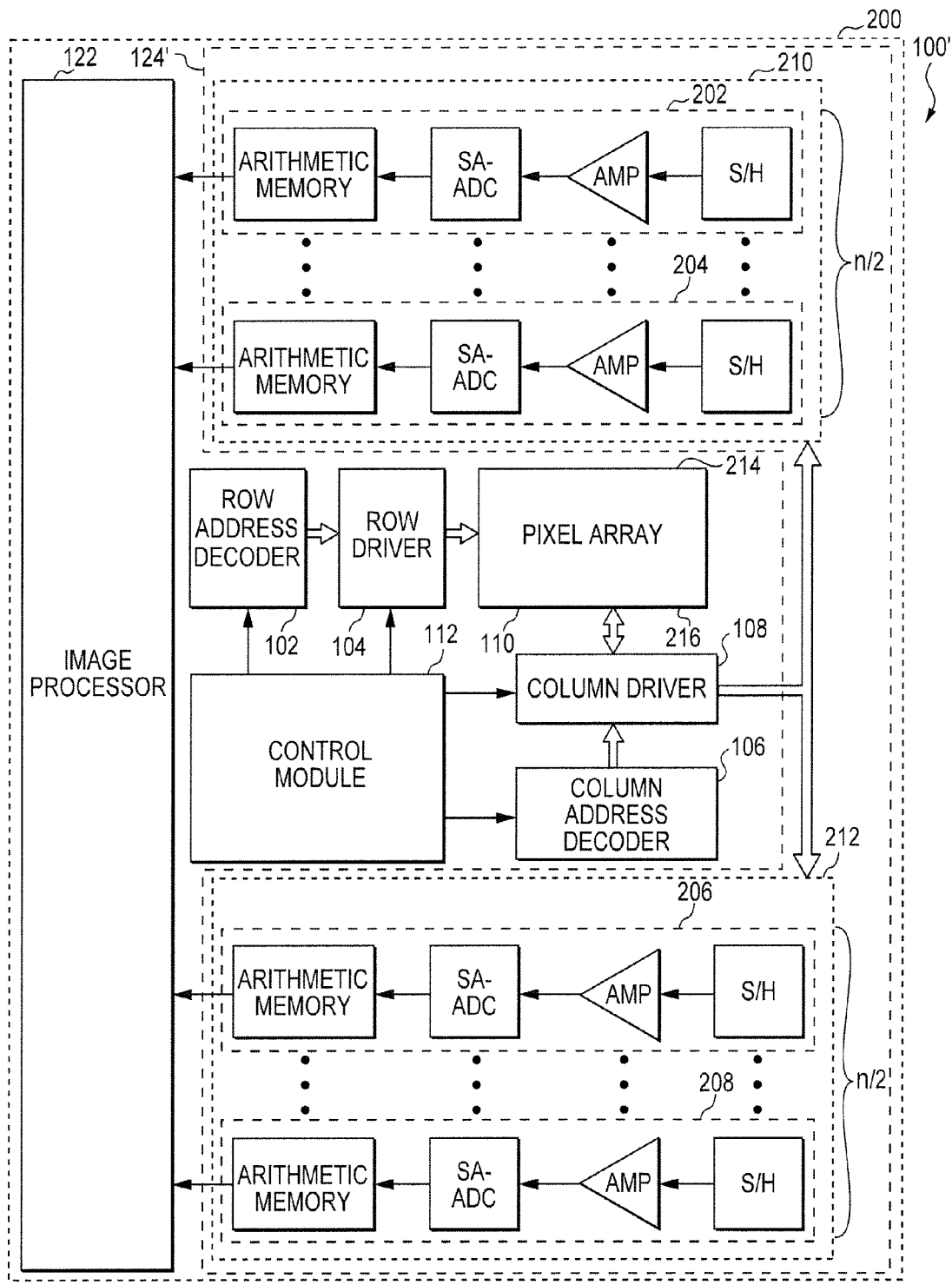
FIG. 2 is an example implementation of a portion of an imager in accordance with another embodiment disclosed herein.

FIG. 2 shows an imager 100' implemented in a semiconductor chip 200 in accordance with another embodiment disclosed herein. In FIG. 2, imager 100' has a digital correlated double sampling module 124' that includes a first set 210 of n/2 processing modules 202-204 along a first side 214 of pixel array 110 and a second set 212 of processing modules 206-208 along a second side 216 of the pixel array 110. For example, processing modules 202-204 may process pixel reset signals $V_{rst}$ and pixel image signals $V_{sig}$ for pixels in even columns of pixel array 110, and processing modules 206-208 may process pixel reset signals $V_{rst}$ and pixel image signals $V_{sig}$ for pixels in odd columns of pixel array 110, or vice versa. In FIG. 2, the first and second sides 214, 216 are shown to be on opposite sides of pixel array 110 for illustrative purposes, though the embodiments described herein are not limited in this respect.

In FIG. 2, each processing module 202, 204, 206, 208 is shown to include one sample-and-hold device, amplifier, successive approximation analog-to-digital converter, and arithmetic memory. However, persons skilled in the relevant art(s) will recognize that sample-and-hold devices, amplifiers, successive approximation analog-to-digital converters, and/or arithmetic memories may be shared among any one or more processing modules 202-204 in the first set 210 and/or any one or more processing modules 206-208 in the second set 212.

Figure 3:
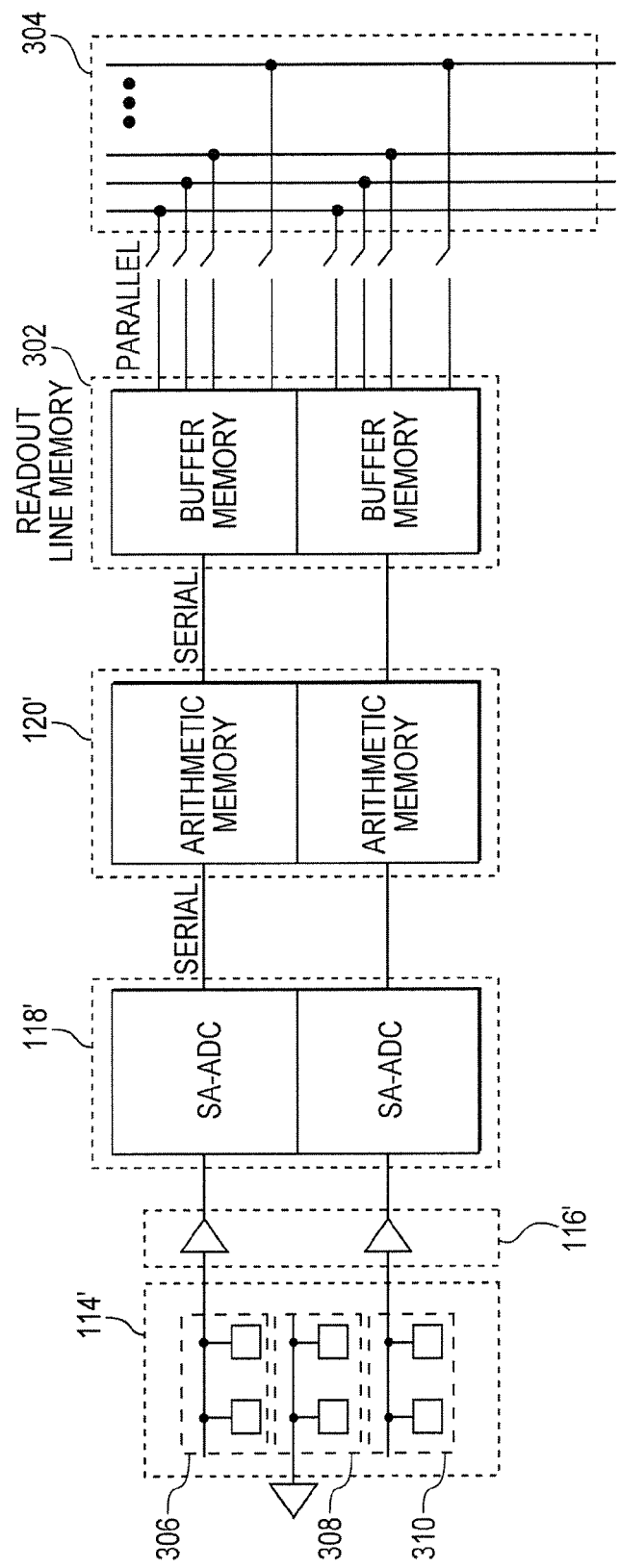
FIG. 3 is an example implementation of a digital correlated double sampling module in accordance with an embodiment described herein.

FIG. 3 is an example implementation of a digital correlated double sampling module, such as digital correlated double sampling module 124 or 124' of respective FIGS. 1 and 2, in accordance with an embodiment described herein. In FIG. 3, arithmetic memory module 120' is shown to be coupled between successive approximation analog-to-digital converter module 118' and a line memory module 302 for illustrative purposes. Each buffer memory in line memory module 302 provides bits of a respective digital difference signal in parallel to readout bus 304. Sample-and-hold devices 306 and 310 are shown to be coupled to a readout bus 304 (via 116', 118', 120', and 302). Sample-and-hold device 308 may be coupled to readout bus 304 or a different readout bus. For example, readout bus 304 may correspond to even columns of pixel array 110, and the other readout bus may correspond to odd columns of pixel array 110, or vice versa.

Embodiments described herein may utilize any of a variety of techniques to generate digital difference signals for respective pixels of pixel array 100 based on the respective digital pixel reset signals and digital pixel image signals. In accordance with a first example technique, each arithmetic memory of imager 100 or 100' may be configured to generate a two's complement of the respective digital pixel reset signal $DN_{rst}$ and to perform a MSB-first addition of the respective digital pixel image signal $DN_{sig}$ and the two's complement of the respective digital pixel reset signal $DN_{rst}$ to generate the respective digital difference signal. A carry condition may occur during the MSB-first addition operation. For instance, if corresponding bits of the digital pixel image signal $DN_{sig}$ and the two's complement of the digital pixel reset signal $DN_{rst}$ are both "1", then a "1" needs to be carried to the next most significant bit. The arithmetic memories utilize an overflow bit and a sign bit to accommodate the carry condition. When a carry condition occurs, an arithmetic memory sets the corresponding bit of the digital difference signal to "0" and inverts the next consecutive more significant bits of the digital difference signal until corresponding bits of the digital pixel image signal $DN_{sig}$ and the two's complement of the digital pixel reset signal $DN_{rst}$ are both "0". The corresponding bit of the digital difference signal is set to "1", and subsequent bits of the digital pixel image signal $DN_{sig}$ and the two's complement of the digital pixel reset signal $DN_{rst}$ continue to be added.

FIG. 4 illustrates examples of the MSB-first addition of digital pixel image signals and the two's complement of digital pixel reset signals in accordance with the first example technique according to an embodiment described herein. In FIG. 4, four examples are provided in which the value of a digital pixel image signal $DN_{sig}$ is represented by the variable "A", and the value of the two's complement of a digital pixel reset signal $DN_{rst}$ is represented by the variable "B". In the first example, a digital pixel image signal $DN_{sig}$ having a value of +14 is added to the two's complement of a digital pixel reset signal $DN_{rst}$ having a value of −3 to provide a digital difference signal having a value of +11. In the second example, a digital pixel image signal $DN_{sig}$ having a value of +14 is added to the two's complement of a digital pixel reset signal $DN_{rst}$ having a value of −10 to provide a digital difference signal having a value of +4. In the third example, a digital pixel image signal $DN_{sig}$ having a value of +14 is added to the two's complement of a digital pixel reset signal $DN_{rst}$ having a value of −15 to provide a digital difference signal having a value of −1. In the fourth example, a digital pixel image signal $DN_{sig}$ having a value of +1 is added to the two's complement of a digital pixel reset signal $DN_{rst}$ having a value of −12 to provide a digital difference signal having a value of −11. These examples are provided for illustrative purposes and are not intended to be limiting. In FIG. 4, the example digital pixel image signal values are shown to be positive, and the example values of the two's complement of the digital pixel reset signals are shown to be negative for illustrative purposes. It should be noted that the embodiments described herein are applicable to digital pixel image signals and digital pixel reset signals having any values. For instance, the digital pixel image signals may have negative values, and/or the two's complement of the digital pixel reset signals may have positive values.

In accordance with a second example technique, each arithmetic memory may be configured to perform a MSB-first subtraction of the respective digital pixel image signal $DN_{sig}$ from the respective digital pixel reset signal $DN_{rst}$ to generate a respective digital intermediate signal, which is then processed using a two's complement algorithm to generate the respective digital difference signal. A borrow condition may occur during the MSB-first subtraction operation. For instance, if corresponding bits of the digital pixel reset signal $DN_{rst}$ and the digital pixel image signal $DN_{sig}$ are "0" and "1", respectively, then a "1" needs to be borrowed from the next consecutive more significant bit. The arithmetic memories utilize an overflow bit and a sign bit to accommodate the borrow condition. When a borrow condition occurs, an arithmetic memory sets the corresponding bit of the digital intermediate signal to "1" and inverts the next consecutive more significant bits of the digital intermediate signal until corresponding bits of the digital pixel reset signal $DN_{rst}$ and the digital pixel image signal $DN_{sig}$ having respective values of "1" and "0" are encountered. The corresponding bit of the digital intermediate signal is set to "0", and subsequent bits of the digital pixel reset signal $DN_{rst}$ and the digital pixel image signal $DN_{sig}$ continue to be subtracted.

FIG. 5 illustrates examples of the MSB-first subtraction of digital pixel reset signals and digital pixel image signals in accordance with the second example technique according to an embodiment described herein. In FIG. 5, four examples are provided in which the value of a digital pixel reset signal $DN_{rst}$ is represented by the variable "A", and the value of a digital pixel image signal $DN_{sig}$ is represented by the variable "B". In the first example, a digital pixel image signal $DN_{sig}$ having a value of +3 is subtracted from a digital pixel reset signal $DN_{rst}$ having a value of +14 to provide a digital intermediate signal having a value of +11. In the second example, a digital pixel image signal $DN_{sig}$ having a value of +10 is subtracted from a digital pixel reset signal $DN_{rst}$ having a value of +14 to provide a digital intermediate signal having a value of +4. In the third example, a digital pixel image signal $DN_{sig}$ having a value of +15 is subtracted from a digital pixel reset signal $DN_{rst}$ having a value of +14 to provide a digital intermediate signal having a value of −1. In the fourth example, a digital pixel image signal $DN_{sig}$ having a value of +12 is subtracted from a digital pixel reset signal $DN_{rst}$ having a value of +1 to provide a digital intermediate signal having a value of −11. These examples are provided for illustrative purposes and are not intended to be limiting. In FIG. 5, the example digital pixel reset signal values and the example digital pixel image signal values are shown to be positive. It should be noted that the embodiments described herein are applicable to digital pixel reset signals and digital pixel image signals having any values. For instance, the digital pixel reset signals and/or the digital pixel image signals may have negative values. The digital intermediate signals described with reference to the examples shown in FIG. 5 are processed in accordance with a two's complement algorithm to generate the respective digital difference signals.

The digital difference signal generation techniques described above with reference to FIGS. 4 and 5 are provided for illustrative purposes and are not intended to be limiting. Persons skilled in the relevant art(s) will recognize that changes may be made to the described techniques without extending beyond the scope of the embodiments described herein.

Figure 6:
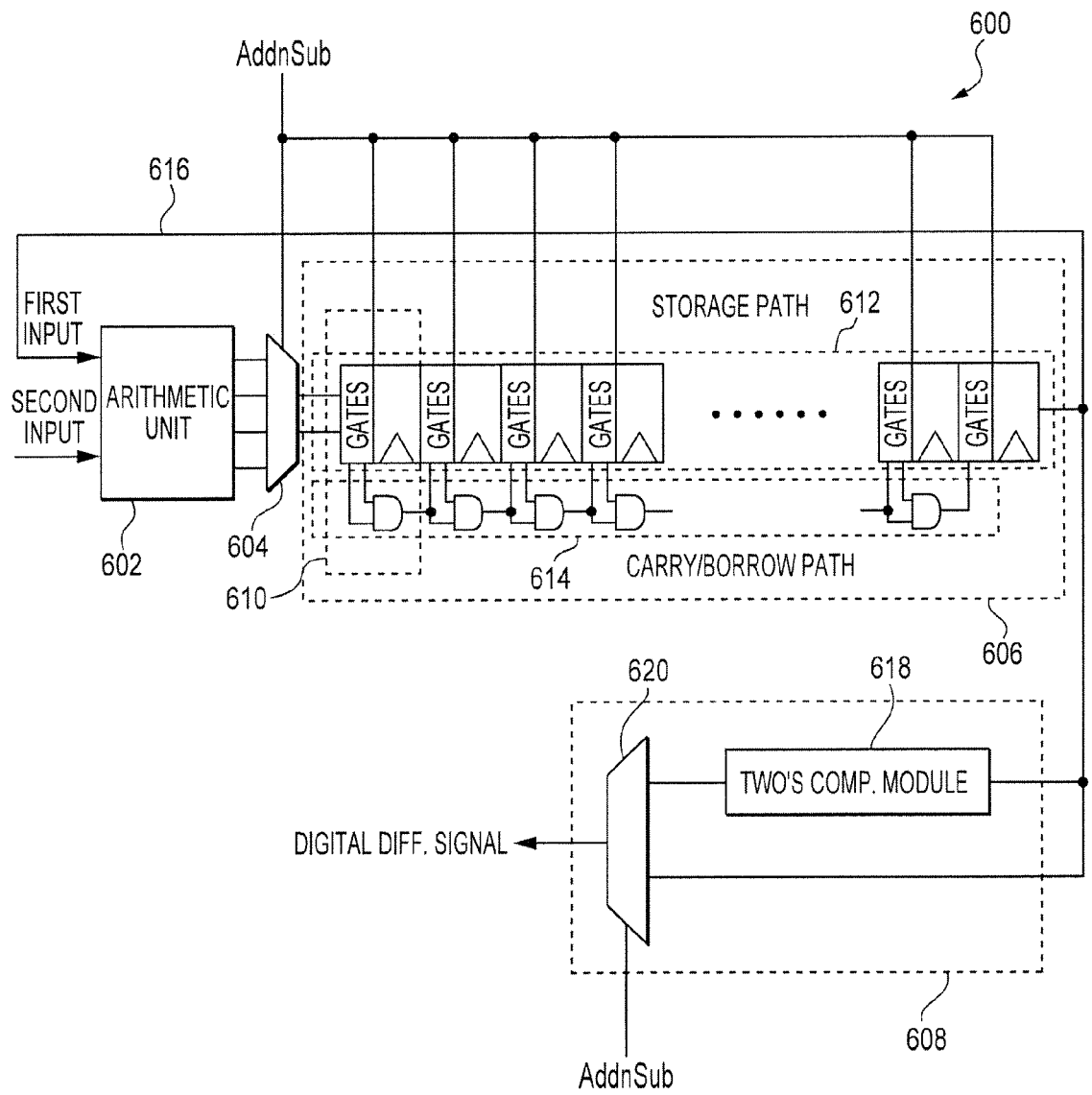
FIGS. 6 and 7 are example implementations of an arithmetic memory in accordance with embodiments disclosed herein.

FIG. 6 is an example implementation of an arithmetic memory 600 in accordance with an embodiment disclosed herein. Arithmetic memory 600 is now described at a high level with components thereof described in greater detail below with reference to FIGS. 8-11. In the illustrated embodiment, arithmetic memory 600 includes an arithmetic unit 602, a first multiplexer 604, logic 606, and a selection module 608, which collaborate to effectively subtract a digital pixel reset signal $DN_{rst}$ from a digital pixel image signal $DN_{sig}$. In general, arithmetic unit 602 performs MSB-first bitwise logical operations based on First and Second Inputs and provides a plurality of output signals corresponding to the respective MSB-first bitwise logical operations. Multiplexer 604 selects among the plurality of output signals based on a control signal AddnSub and provides the selected output signals to logic 606. Logic 606 processes the selected output signals in a MSB-first bitwise manner to generate the bits of a digital output signal for the pixel.

Logic 606 includes a generation module 612, which is also referred to as a storage path, and a propagation module 614, which is also referred to as a carry/borrow path. Generation module 612 includes a plurality of generation cells that perform operations based on the selected output signals from first multiplexer 604 and the control signal AddnSub. Propagation module 614 includes a plurality of propagation cells that indicate when a borrow condition or a carry condition occurs with respect to the respective associated generation cell. Each generation cell and associated propagation cell may be referred to collectively as a unit cell 610.

More specifically, the output of logic 606 is provided as the First Input to arithmetic unit 602 via feedback 616 to enable a recursive computation, which is described in further detail below. The output from a successive approximation analog-to-digital converter (see, e.g., FIGS. 1-3) is provided as the Second Input to arithmetic unit 602. The Second Input initially includes a digital pixel reset signal $DN_{rst}$ for a pixel of pixel array 110. The digital pixel reset signal $DN_{rst}$ or a two's complement thereof is stored in logic 606. A digital pixel image signal $DN_{sig}$ for the pixel is then provided as the Second Input and combined with the stored digital pixel reset signal $DN_{rst}$ (or two's complement thereof), which is received via feedback 616 as the First Input. The combined digital signal is stored in logic 606 and provided as a digital output signal to selection module 608.

Selection module 608 includes a two's complement module 618, which processes the digital output signal of logic 606 in accordance with a two's complement algorithm to provide a two's complement of the digital output signal. Selection module 608 further includes a second multiplexer 620 to select among the digital output signal and the two's complement thereof based on the control signal AddnSub. The control signal AddnSub indicates whether an addition operation (i.e., the addition of $DN_{sig}$ and the two's complement of $DN_{rst}$ in accordance with the first example technique) or a subtraction operation (i.e., the subtraction of $DN_{sig}$ from $DN_{rst}$ in accordance with the second example technique) is being performed. If the control signal AddnSub indicates that the addition operation is being performed, second multiplexer 620 selects the digital output signal of logic 606 to be provided as the digital difference signal for the pixel. On the other hand, if the control AddnSub indicates that the subtraction operation is being performed, second multiplexer 620 selects the two's complement of the digital output signal to be provided as the digital difference signal for the pixel. Thus, the digital difference signal represents the effective subtraction of the digital pixel reset signal $DN_{rst}$ from the digital pixel image signal $DN_{sig}$, regardless which of the example techniques is employed.

Persons skilled in the relevant art(s) will recognize that arithmetic memory 600 need not necessarily include selection module 608. For example, selection module 608 may be included in image processor 122. In another example, selection module 608 may not be needed at all if the second example technique is not being employed.

Figure 7:
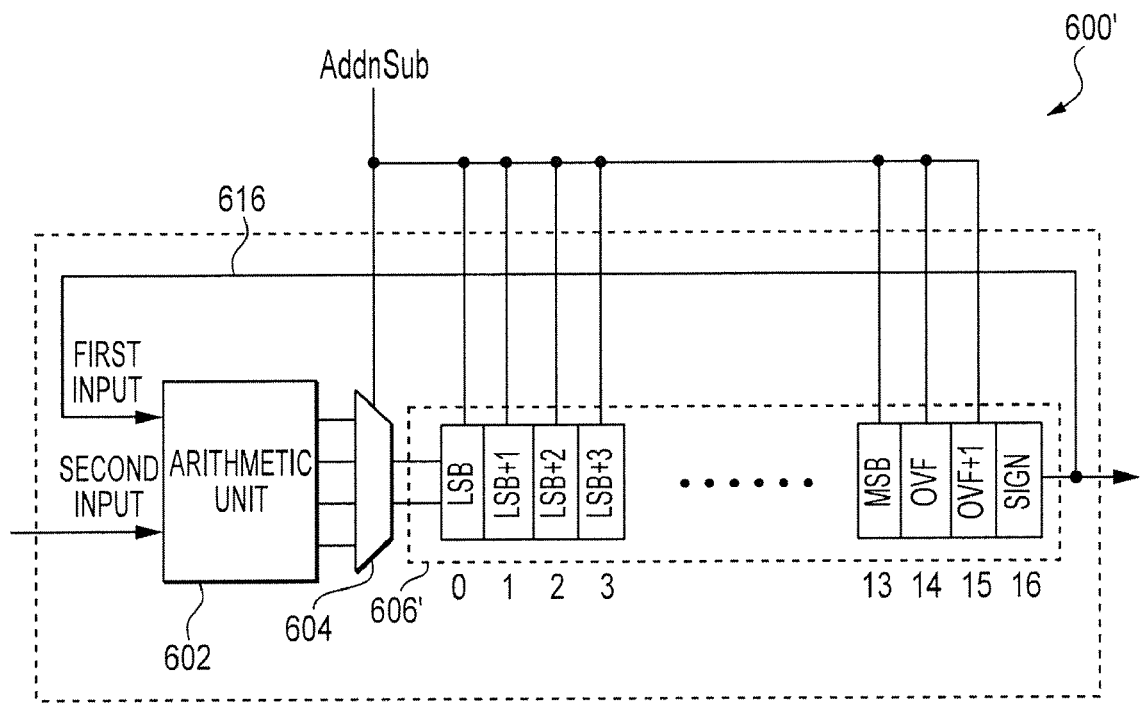

FIG. 7 is an example implementation of an arithmetic memory 600' in accordance with another embodiment disclosed herein. Arithmetic memory 600' is now described with reference to the first example technique described above, in which a MSB-first addition is performed by adding a digital pixel image signal $DN_{sig}$ and the two's complement of the corresponding digital pixel reset signal $DN_{rst}$ to generate a digital difference signal, for ease of discussion and is not intended to be limiting. For instance, arithmetic memory 600' may include a selection module, such as selection module 608 of FIG. 6, and may be used to employ the second example technique, in which a MSB-first subtraction is performed by subtracting a digital pixel image signal $DN_{sig}$ from the corresponding digital pixel reset signal $DN_{rst}$ to generate a digital intermediate signal, which is then processed using a two's complement algorithm to generate the digital difference signal.

In the illustrated embodiment, arithmetic memory 600' generates a digital difference signal having fourteen bits for illustration, though persons skilled in the relevant art(s) will recognize that the digital difference signal may have any number of bits. The digital difference signal is ultimately stored in the unit cells 0-13 of logic 606'. Unit cells 14 and 15 are overflow cells that store overflow bits. Logic 606' may include any number of overflow cells, including zero, one, two, three, etc. Unit cell 16 is a sign cell that stores a sign bit, which is provided as the First Input of arithmetic unit 602 via feedback 616. Overflow cells 14 and 15 and sign cell 16 are included to facilitate processing a two's complement value, for example the two's complement of a digital pixel reset signal $DN_{rst}$ in accordance with the first example technique. Also, sign cell 16 may facilitate processing a digital pixel reset signal $DN_{rst}$ and a digital pixel image signal $DN_{sig}$ corresponding to a low-light condition. For example, if the pixel data in the active area is close to the optical black (OB) pixel level of the imager, temporal noise may cause the digital pixel reset signal $DN_{rst}$ to be greater than the digital pixel image signal $DN_{sig}$. In this example, a computation of $DN_{sig} - DN_{rst}$ provides a negative result. In the absence of a sign bit, the computation of $DN_{sig} - DN_{rst}$ provides a large positive result.

Figure 8:
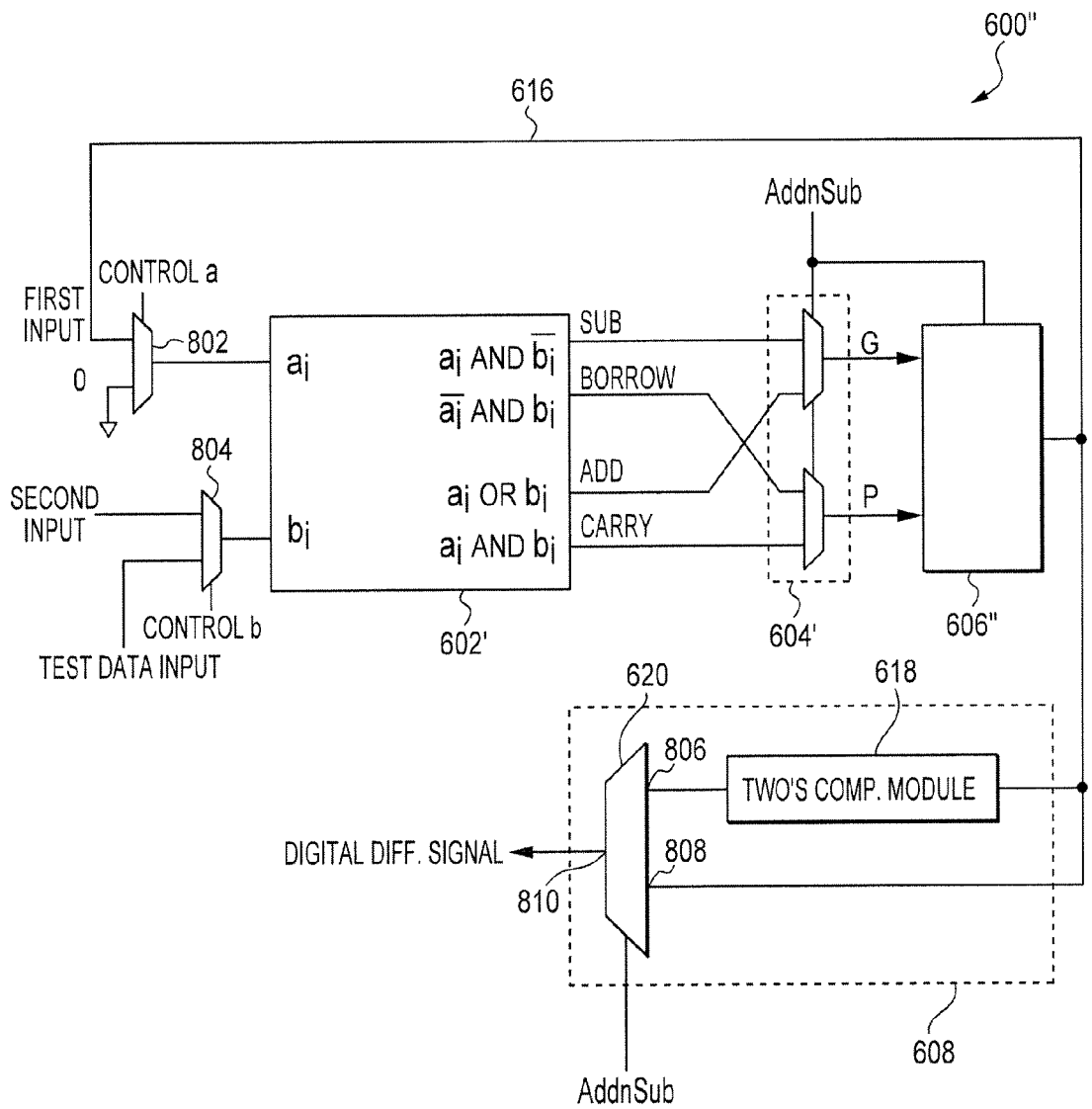
FIG. 8 is an example implementation of a portion of an arithmetic memory in accordance with an embodiment disclosed herein.

FIG. 8 is an example implementation of an arithmetic memory 600" in accordance with yet another embodiment disclosed herein. Arithmetic memory 600" includes a first multiplexer 802, a second multiplexer 804, an arithmetic unit 602', a third multiplexer 604', logic 606", and selection module 608. First multiplexer 802 selects a First Input from feedback 616 or a null signal having a plurality of bits each representing a logical "0" based on a first control signal Control_a and provides the selected signal to input terminal a, of arithmetic unit 602'. If the first control signal Control_a is set to a first state (e.g., a logical "0"), first multiplexer 802 provides the First Input to terminal $a_i$. If the first control signal Control_a is set to a second state (e.g., a logical "1"), first multiplexer 802 provides the null signal to terminal $a_i$.

Second multiplexer 804 selects a Second Input from a successive approximation analog-to-digital converter (see, e.g., FIGS. 1-3) or a Test Data Input based on a second control signal Control_b and provides the selected signal to input terminal $b_i$ of arithmetic unit 602'. If the second control signal Control_b is set to a first state (e.g., a logical "0"), second multiplexer 804 provides the Second Input to terminal $b_i$. If the second control signal Control_b is set to a second state (e.g., a logical "1"), second multiplexer 804 provides the Test Data Input to terminal $b_i$.

The Second Input includes a first digital pixel reset signal $DN_{rst1}$ of a first pixel, followed by a first digital pixel image signal $DN_{sig1}$ of the first pixel, followed by a second digital pixel reset signal $DN_{rst2}$ of a second pixel, followed by a second digital pixel image signal $DN_{sig2}$ of the second pixel, and so on. The Second Input may be received from a predetermined number of column lines (e.g., one, two, three, etc.), though the scope of the embodiments described herein are not limited in this respect. Arithmetic unit 602' performs a plurality of bitwise logical operations and generates corresponding output signals upon processing each digital pixel reset signal $DN_{rst}$ and upon processing each digital pixel image signal $DN_{sig}$. In the following discussion, the signals that result from each iteration of the plurality of bitwise logical operations are given a numerical subscript. For example, the output signals generated as a result of receiving a digital pixel reset signal $DN_{rst}$ are given a subscript of "1", and the output signals generated as a result of receiving a digital pixel image signal $DN_{sig}$ are given a subscript of "2".

When a digital pixel reset signal $DN_{rst}$ is received as the Second Input, the second control signal Control_b is set to the first state, causing second multiplexer 804 to provide the digital pixel reset signal $V_{rst}$ to terminal $b_i$ of arithmetic unit 602'. First control signal Control_a is set to the second state, causing first multiplexer 802 to provide the null signal to terminal $a_i$ of arithmetic unit 602'. Arithmetic unit 602' performs a first bitwise logical AND operation based on corresponding bits of the null signal and the inverse of the digital pixel reset signal $DN_{rst}$ to provide a first subtraction signal $SUB_1$. Arithmetic unit 602' performs a second bitwise logical AND operation based on corresponding bits of the digital pixel reset signal $V_{rst}$ and the inverse of the null signal (i.e., a plurality of bits each representing a logical "1") to provide a first borrow signal $BORROW_1$. Arithmetic unit 602' performs a bitwise logical OR operation based on corresponding bits of the null signal and the digital pixel reset signal $DN_{rst}$ to provide a first addition signal $ADD_1$. Arithmetic unit 602' performs a third bitwise logical AND operation based on corresponding bits of the null signal and the digital pixel reset signal $DN_{rst}$ to provide a first carry signal $CARRY_1$.

The control signal AddnSub indicates whether a subtraction operation of $a_i$-$b_i$ is to be performed or an addition operation of $a_i$+$b_i$ is to be performed. If the control signal AddnSub is set to a first state (e.g., a logical "0"), arithmetic memory 600" subtracts the digital pixel reset signal $DN_{rst}$ at terminal $b_i$ from the null signal at terminal $a_i$ to generate the two's complement of the digital pixel reset signal $DN_{rst}$, which is then stored in logic 606" in accordance with the first example technique. Third multiplexer 604' selects the first subtraction signal $SUB_1$ as the first generation signal $G_1$ and the first borrow signal $BORROW_1$ as the first propagation signal $P_1$. Logic 606" processes the first generation signal $G_1$ and the first propagation signal $P_1$ to generate and store the two's complement of the digital pixel reset signal $DN_{rst}$.

On the other hand, if the control signal AddnSub is set to a second state (e.g., a logical "1"), arithmetic memory 600" adds the digital pixel reset signal $DN_{rst}$ at terminal $b_i$ to the null signal at terminal $a_i$, and the resulting digital pixel reset signal $DN_{rst}$ is stored in logic 606" in accordance with the second example technique. Third multiplexer 604' selects the first addition signal $ADD_1$ as the first generation signal $G_1$ and the first carry signal $CARRY_1$ as the first propagation signal $P_1$. Logic 606" processes the first generation signal $G_1$ and the first propagation signal $P_1$ to generate and store the resulting digital pixel reset signal $DN_{rst}$.

When a digital pixel image signal $DN_{sig}$ corresponding to the digital pixel reset signal $DN_{rst}$ is received as the Second Input, the second control signal Control_b remains in the first state, causing second multiplexer 804 to provide the digital pixel image signal $V_{sig}$ to terminal $b_i$ of arithmetic unit 602'. First control signal Control_a is set to the first state, causing first multiplexer 802 to provide the digital pixel reset signal $DN_{rst}$ (or two's complement thereof that is stored in logic 606 to terminal $a_i$ of arithmetic unit 602' via feedback 616. Arithmetic unit 602 performs a first bitwise logical AND operation based on corresponding bits of the digital pixel reset signal $DN_{rst}$ (or two's complement thereof) and the inverse of the digital pixel image signal $DN_{sig}$ to provide a second subtraction signal $SUB_2$. Arithmetic unit 602 performs a second bitwise logical AND operation based on corresponding bits of the digital pixel image signal $DN_{sig}$ and the inverse of the digital pixel reset signal $DN_{rst}$ (or two's complement thereof) to provide a second borrow signal $BORROW_2$. Arithmetic unit 602 performs a bitwise logical OR operation based on corresponding bits of the digital pixel reset signal $DN_{rst}$ (or two's complement thereof) and the digital pixel image signal $DN_{sig}$ to provide an second addition signal $ADD_2$. Arithmetic unit 602 performs a third bitwise logical AND operation based on corresponding bits of the digital pixel reset signal $DN_{rst}$ (or two's complement thereof) and the digital pixel image signal $DN_{sig}$ to provide a second carry signal $CARRY_2$.

If the two's complement of the digital pixel reset signal $DN_{rst}$ is stored in logic 606" and fed back to terminal $a_i$, the control signal AddnSub is set to the second state (e.g., a logical "1"), indicating that the digital pixel image signal $DN_{sig}$ at terminal $b_i$ is to be added to the two's complement of the digital pixel reset signal $DN_{rst}$ at terminal $a_i$ in accordance with the first example technique. Third multiplexer 604' selects the second addition signal $ADD_2$ as the second generation signal $G_2$ and the second carry signal $CARRY_2$ as the second propagation signal $P_2$. Logic 606" processes the second generation signal $G_2$ and the second propagation signal $P_2$ to generate and store the digital difference signal, representing the effective subtraction of the digital pixel reset signal $DN_{rst}$ from the digital pixel image signal $DN_{sig}$.

If the digital pixel reset signal $DN_{rst}$ is stored in logic 606" and fed back to terminal $a_i$, the control signal AddnSub is set to the first state (e.g., a logical "0"), indicating that the digital pixel image signal $DN_{sig}$ at terminal $b_i$ is to be subtracted from the digital pixel reset signal $DN_{rst}$ at terminal $a_i$ in accordance with the second example technique. Third multiplexer 604' selects the second subtraction signal $SUB_2$ as the second generation signal $G_2$ and the second borrow signal $BORROW_2$ as the second propagation signal $P_2$. Logic 606" processes the second generation signal $G_2$ and the second propagation signal $P_2$ to generate and store a digital intermediate signal, representing the effective subtraction of the digital pixel image signal $DN_{sig}$ from the digital pixel reset signal $DN_{rst}$.

In the FIG. 8 embodiment, selection module 608 includes two's complement module 618 and multiplexer 620 having a first input terminal 806, a second input terminal 808, and an output terminal 810. Two's complement module 618 generates a two's complement of the output from logic 606", regardless of whether the output from logic 606" is the digital difference signal or the digital intermediate signal. If the output from logic 606" is the digital difference signal, the control signal AddnSub is set to the second state (e.g., a logical "1"), causing multiplexer 620 to select the digital difference signal from second input terminal 808 and provide the digital difference signal at output terminal 622 in accordance with the first example technique.

On the other hand, if the output from logic 606" is the digital intermediate signal, the control signal AddnSub is set to the first state (e.g., a logical "0"), causing multiplexer 620 to select the two's complement of the digital intermediate signal from first input terminal 806 and provide the two's complement of the digital intermediate signal at output terminal 622. The two's complement of the digital intermediate signal is the same as the digital difference signal. Thus, multiplexer 620 provides the digital difference signal at output terminal 622 in accordance with the second example technique.

The digital pixel reset signals $DN_{rst}$ and digital pixel image signals $DN_{sig}$ that are included in Second Input may correspond with a low-light area of the pixel array 110. For example, the low-light area pixel data sometimes results in a negative value after a digital correlated double sampling (CDS) operation due to temporal noise (e.g., $DN_{rst} > DN_{sig}$). The negative value may be considered as a zero in subsequent digital processing. Thus, the detail information in the low-light area may be discarded unnecessarily. To keep the detail in the dark region in a scene, an offset value may be loaded before the digital correlated double sampling operation is performed, thereby enabling an offset-binary representation of the pixel data. The Test Data Input signal may be used to provide the offset loading. For example, the second control signal Control_b may be set to the second state (e.g., a logical "1"), causing second multiplexer 804 to provide the Test Data Input signal to terminal $b_i$ before processing the digital pixel reset signals $DN_{rst}$ and digital pixel image signals $DN_{sig}$.

Figure 16:
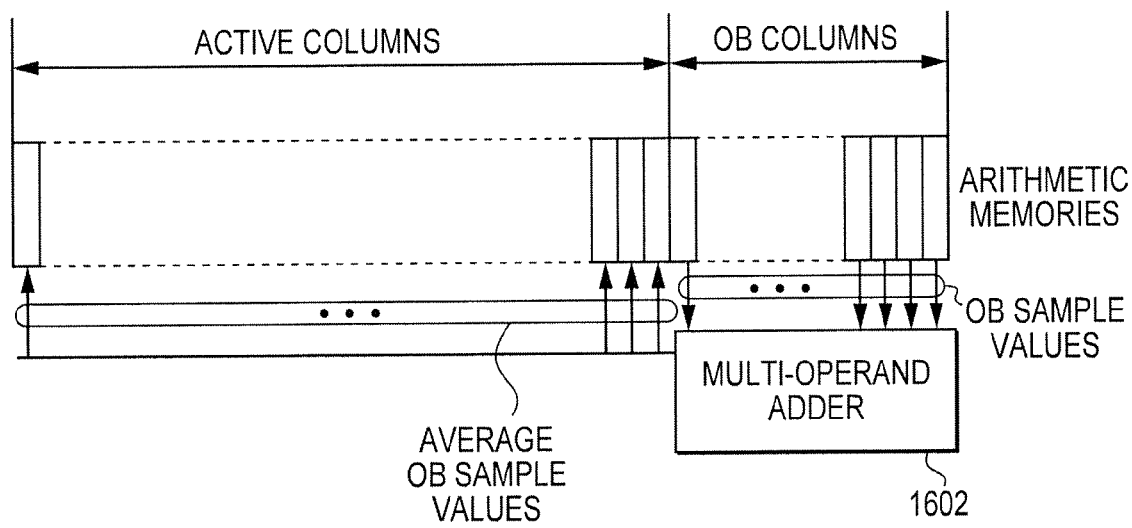
FIG. 16 illustrates the use of a multi-operand adder in accordance with an embodiment described herein.

On-memory row-wise offset correction processing may be performed to improve image quality by utilizing optical black (OB) pixel data and the Test Data Input signal. Row-wise offset variation is primarily due to temporal noise (e.g., the power/ground bounce in the analog signal chain) and control signal jitter, which cause a relatively subtle change of the circuit offset level. The subtle change becomes more noticeable when amplified using a relatively high analog gain, such as 8× or 16×. The row-wise offset fluctuation may be removed by averaging OB samples and subtracting the resulting average OB sample value from the active pixel values. The Test Data Input signal may be used to provide the average OB sample value to terminal $b_i$. Performing the on-memory row-wise offset correction algorithm in arithmetic memories, such as arithmetic memory 600", may save substantial circuit area and/or required row time. FIG. 16 shows that a multi-operand adder 1602 may be used to obtain the average OB sample value. In FIG. 16, multi-operand adder 1602 loads the average OB sample value into the arithmetic memories of active columns. Another way to achieve the on-memory row-wise offset correction is to serially connect the memories in the OB columns and then calculate the average OB sample value.

The Test Data Input signal may be used to facilitate a manufacturing test, such as an automatic test pattern generator (ATPG)-like test of the imager circuitry. Scan-based flip flops are often used in the pure digital core area of an imager to perform a manufacturing fault test. The use of scan-based flip flops in an arithmetic memory may seem undesirable due to the relatively high consumption of area overhead and power associated with the flip flops. However, the scalable memory structure of the embodiments described herein enable the use of scan-based flip flops without affecting the height of the memory structure, as described below with reference to FIG. 14.

Figure 9:
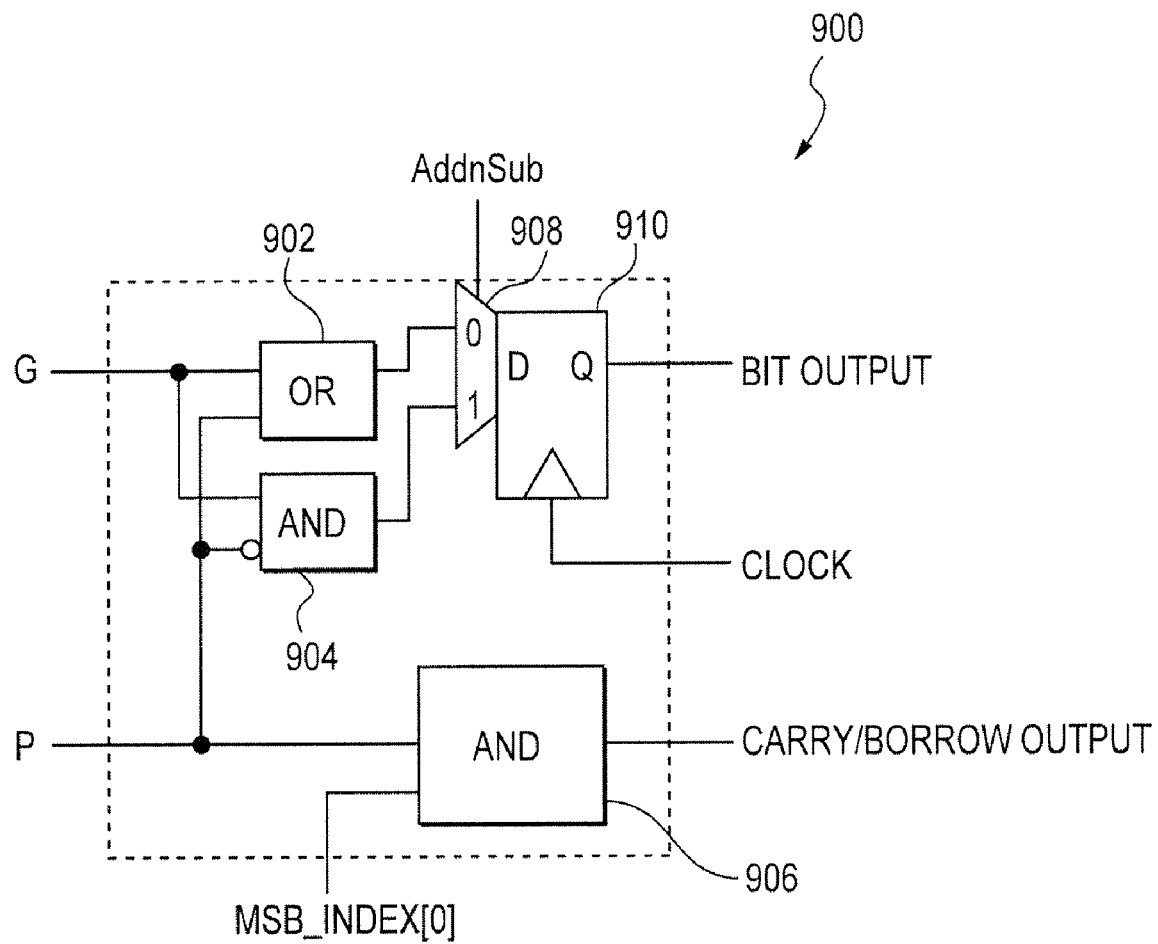
FIGS. 9-11 are example implementations of unit cells in accordance with embodiments disclosed herein.
Figure 10:
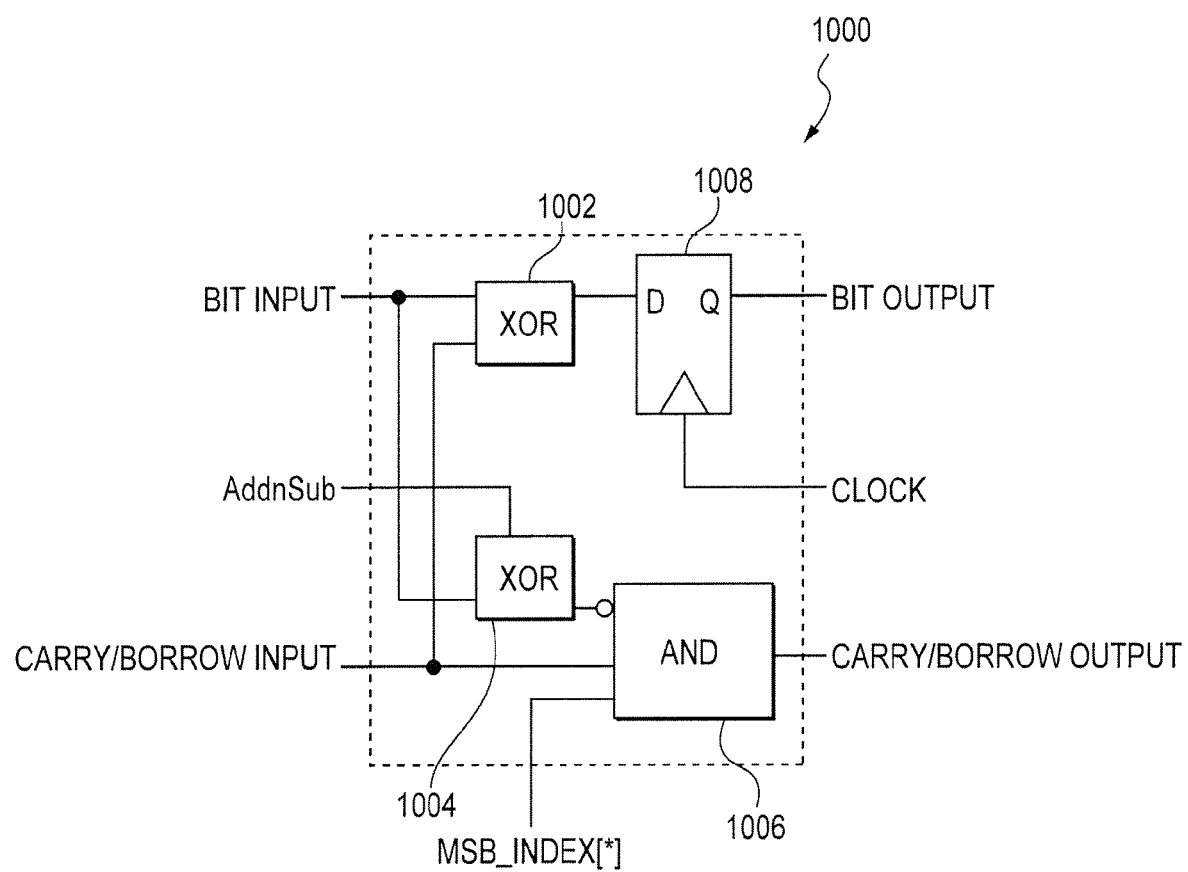
Figure 11:
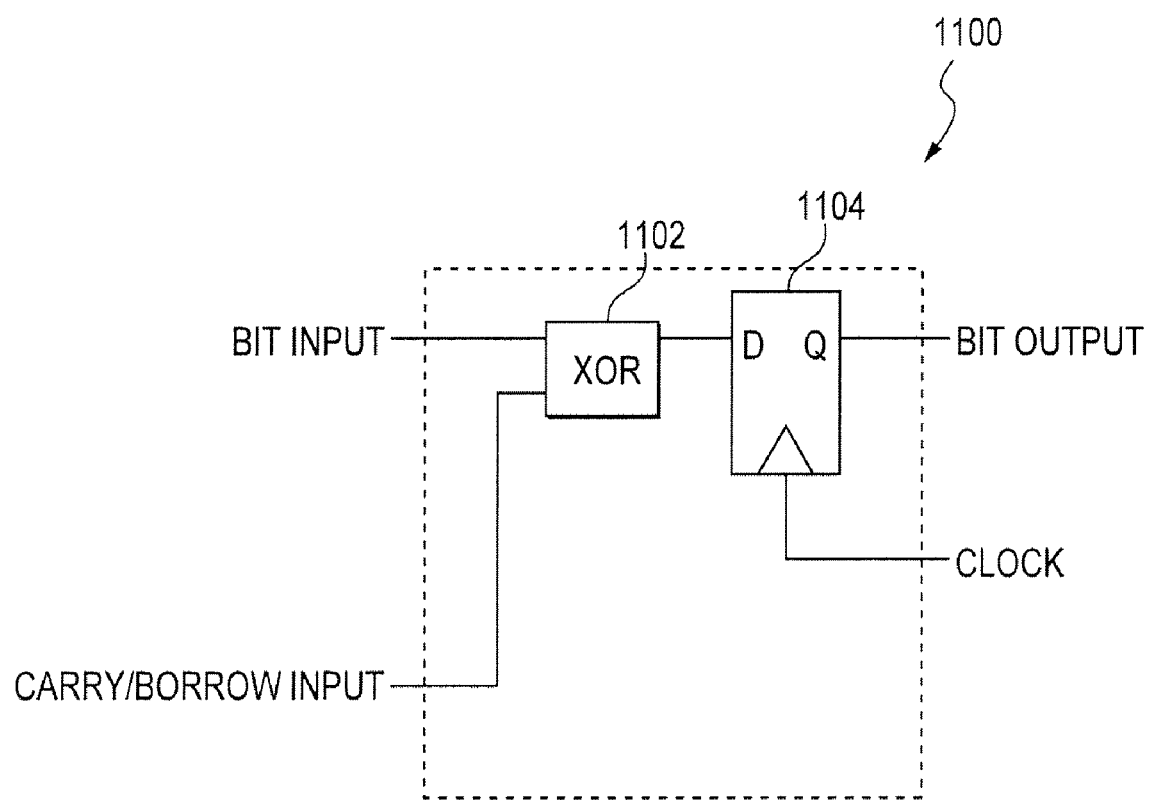

Logic 606, 606', 606" (referred to collectively herein as logic 606), as shown in respective FIGS. 6-8, may include three types of unit cells: a least-significant-bit (LSB) unit cell, a normal unit cell, and a sign-bit unit cell. The normal unit cell is a generic unit cell that can be used to represent any unit cell that is not already designated as a least-significant-bit unit cell or a sign-bit unit cell. FIGS. 9-11 show example implementations of these respective unit cells according to embodiments disclosed herein. The example implementations will be described with continued reference to arithmetic memory 600" and components thereof described above in reference to FIG. 8, though the example implementations are not limited to that embodiment.

Referring now to FIG. 9, LSB unit cell 900 includes a logical OR gate 902, a first logical AND gate 904, a second logical AND gate 906, a multiplexer 908, and a flip-flop 910. LSB unit cell 900 receives a generation signal G and a propagation signal P as inputs. The generation signal G and the propagation signal P may be provided by third multiplexer 604 shown in FIG. 8, for example. Logical OR gate 902 performs a bitwise logical OR operation based on corresponding bits of the generation signal G and the propagation signal P to provide a first signal at a first input of multiplexer 908. First logical AND gate 904 performs a bitwise logical AND operation based on corresponding bits of the generation signal G and the inverse of the propagation signal P to provide a second signal at a second input of multiplexer 908. Multiplexer selects either the first signal or the second signal based on the control signal AddnSub. Flip flop 910 provides the selected signal as a Bit Output signal in accordance with a Clock signal.

Thus, if a subtraction operation is being performed (i.e., AddnSub=0), the Bit Output signal=G OR P=(a AND ~b) OR (~a AND b)=a XOR b, where XOR represents a logical exclusive-OR operation, and "~" represents the inverse of a signal. On the other hand, if an addition operation is being performed (i.e., AddnSub=1), the Bit Output signal=G AND ~P (a OR b) AND ~(a AND b)=a XOR b.

Second logical AND gate 906 performs a bitwise logical AND operation based on corresponding bits of the propagation signal P and a MSB_INDEX signal to provide a Carry/Borrow Output signal. The MSB_INDEX signal is set to a logical "1" for all unit cells other than the most-significant-bit (MSB) unit cell. Thus, if a subtraction operation is being performed (i.e., AddnSub=0), the Carry/Borrow Output signal=P=~a AND b. On the other hand, if an addition operation is being performed (i.e., AddnSub=1), the Carry/Borrow Output signal=P=a AND b.

In FIG. 10, normal unit cell 1000 receives the Bit Output and Carry/Borrow Output signals from the previous adjacent unit cell as respective Bit Input and Carry/Borrow Input signals. Normal unit cell 1000 includes a first logical XOR gate 1002, a second logical XOR gate 1004, a logical AND gate 1006, and a flip flop 1008. First logical XOR gate 1002 performs a bitwise logical XOR operation based on corresponding bits of the Bit Input signal and the Carry/Borrow Input signal to provide a Bit Output signal to flip flop 1008. Flip flop 1008 provides the Bit Output signal in accordance with a Clock signal. Thus, regardless whether a subtraction operation (i.e., AddnSub=0) or an addition operation (i.e., AddnSub=1) is being performed, an N-th stage Bit Output signal=Carry/Borrow Output(N-1) XOR Bit Output(N-1), where N is a positive integer.

Second logical XOR gate 1004 performs a bitwise logical XOR operation based on corresponding bits of the control signal AddnSub and the Bit Input signal to provide an intermediate signal. Logical AND gate 1006 performs a bitwise logical AND operation based on corresponding bits of the inverse of the intermediate signal, the Carry/Borrow Input signal, and the MSB_INDEX signal to provide a Carry/Borrow Output signal. The MSB_INDEX signal is set to a logical "1" for all unit cells other than the most-significant-bit (MSB) unit cell. The MSB_INDEX signal is used to stop the propagation of both Carry and Borrow to inhibit the data from "wrapping around," causing an incorrect result. The propagation of Carry/Borrow may be stopped by the corresponding storage bit conditions or the MSB_INDEX=0 condition.

Thus, if a subtraction operation is being performed (i.e., AddnSub=0), an (N+1)-th stage Carry/Borrow Output signal=Carry/Borrow Output(N-1) AND Bit Output(N-1). On the other hand, if an addition operation is being performed (i.e., AddnSub=1), the (N+1)-th stage Carry/Borrow Output signal=Carry/Borrow Output(N-1) AND Bit Output(N-1).

In FIG. 11, sign-bit unit cell 1100 is similar to the normal unit cell 1000 described with reference to FIG. 10, except sign-bit unit cell 1100 does not include the components necessary for propagation of the Carry/Borrow signal. More specifically, sign-bit unit cell 1100 does not include second logical XOR gate 1004 and logical AND gate 1006 of normal unit cell 1000. The implementation of sign-bit unit cell 1100 in FIG. 11 is provided for illustrative purposes and is not intended to be limiting. For example, person skill in the relevant art(s) will recognize that sign-bit unit cell 1100 may include all of the components of normal unit cell 1000, though some components may not be necessary.

Sign-bit unit cell 1100 receives the Bit Output and Carry/Borrow Output signals from the previous adjacent unit cell as respective Bit Input and Carry/Borrow Input signals. Sign-bit unit cell 1100 includes a logical XOR gate 1102 and a flip flop 1104. Logical XOR gate 1102 performs a bitwise logical XOR operation based on corresponding bits of the Bit Input signal and the Carry/Borrow Input signal to provide a Bit Output signal to flip flop 11104. Flip flop 1104 provides the Bit Output signal in accordance with a Clock signal. Thus, regardless whether a subtraction operation (i.e., AddnSub=0) or an addition operation (i.e., AddnSub=1) is being performed, an N-th stage Bit Output signal=Carry/Borrow Output(N-1) XOR Bit Output(N-1), where N is a positive integer. The Bit Output signal of sign-bit unit cell 1100 may be provided via feedback 616 as the First Input to arithmetic unit 602, as shown in FIG. 7.

Figure 12:
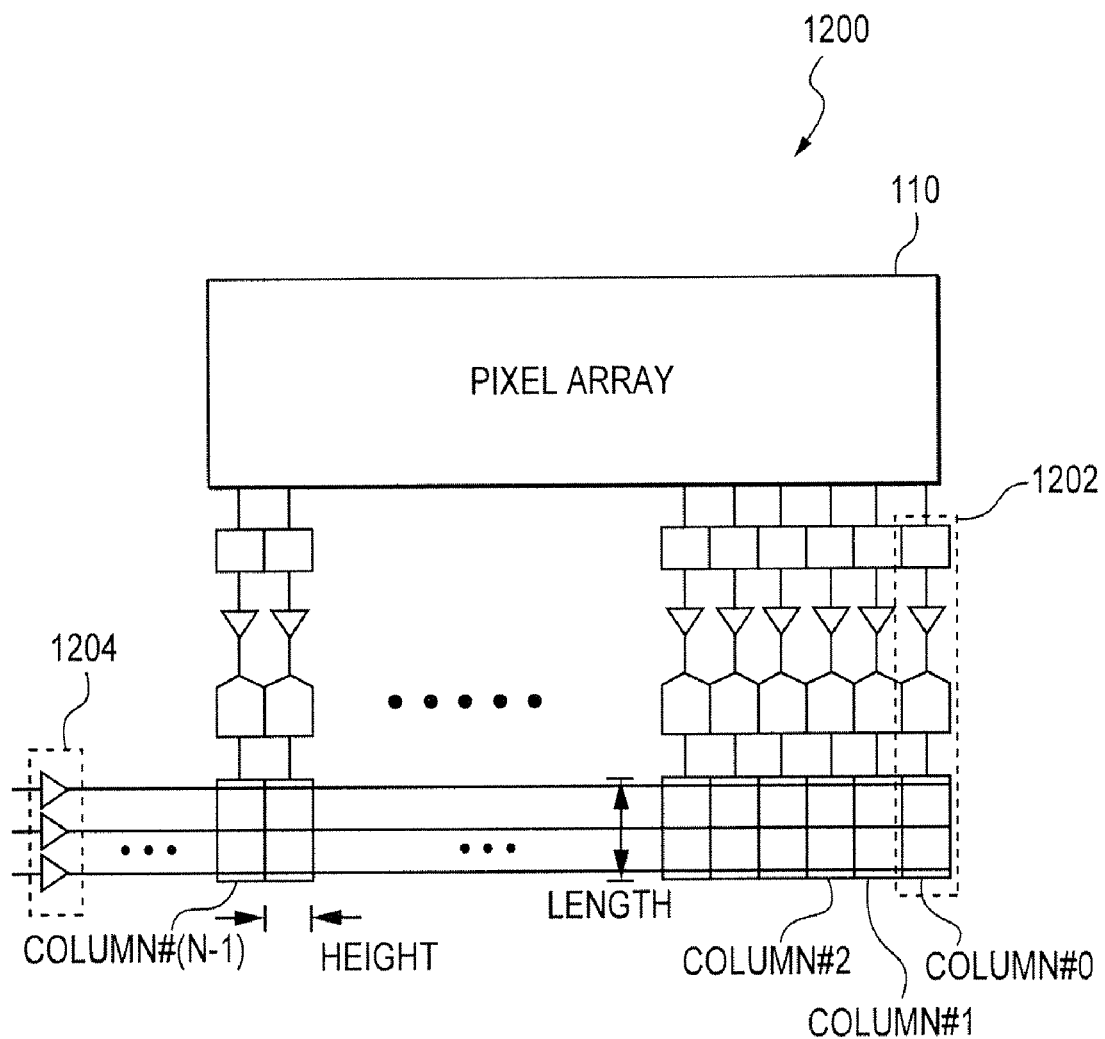
FIG. 12 shows an example array of processing modules coupled to a pixel array in accordance with an embodiment disclosed herein.

FIG. 12 shows an example array 1200 of processing modules 1202 coupled to a pixel array 110 in accordance with an embodiment disclosed herein. In FIG. 12, each processing module 1202 includes a sample-and-hold (S&H) circuit 1212, a column amplifier 1214, a successive-approximation analog-to-digital converter (SA-ADC) 1216, and an arithmetic memory 1218. Drivers 1204 are shown to control arithmetic memories 1218 in array 1200 from the left side for illustrative purposes. For instance, each arithmetic memory 1218 may be controlled from the right side or the left side. The arithmetic memories 1218 in array 1200 operate as a simplified single instruction multiple data (SIMD) circuit, which is suitable for data intensive applications, such as image processing.

Figure 13:
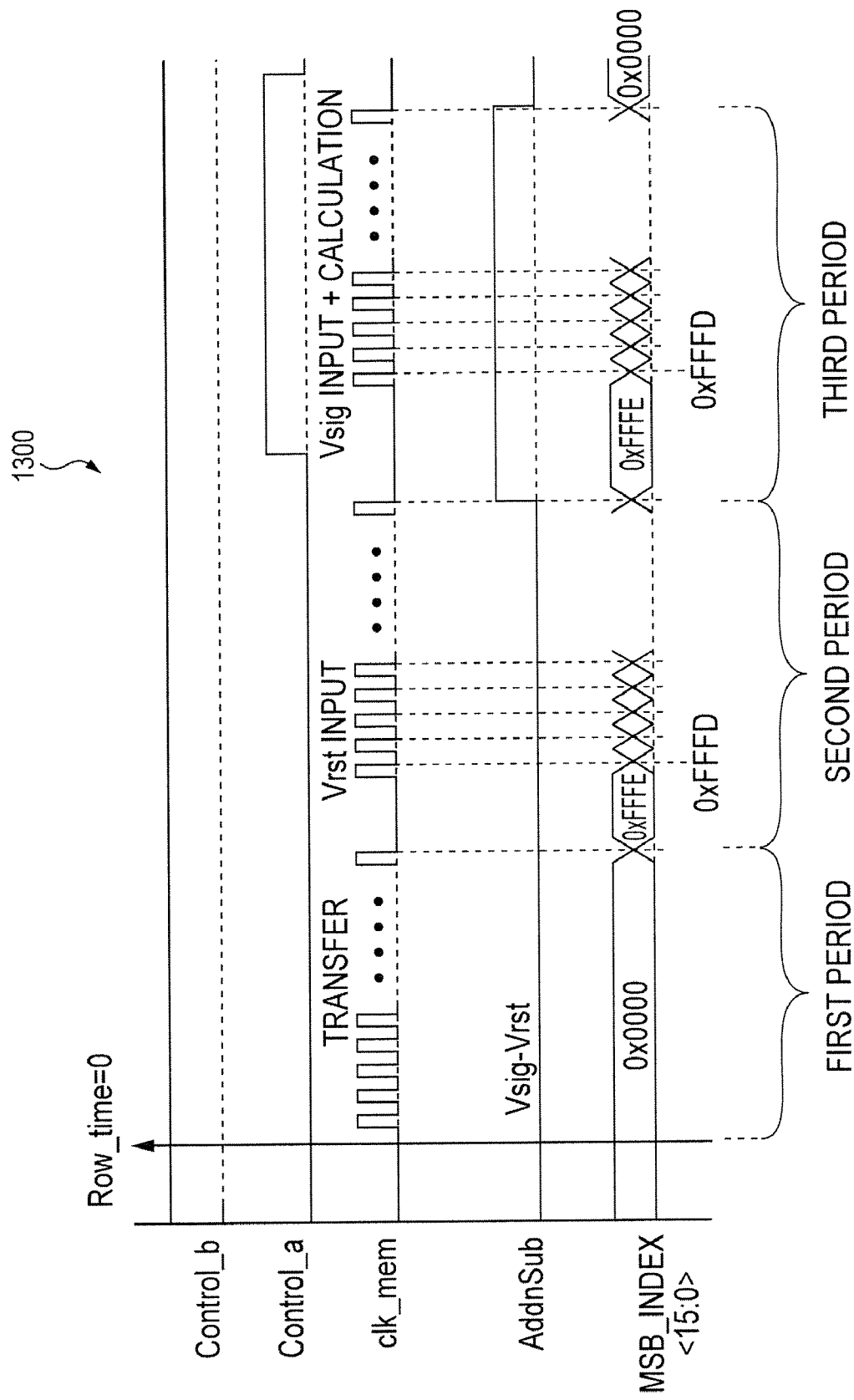
FIG. 13 is a timing diagram in accordance with an embodiment disclosed herein.

FIG. 13 is a timing diagram 1300 in accordance with an embodiment described herein. Timing diagram 1300 shows the timing of signals described with reference to FIGS. 6-11 for three different periods shown in FIG. 13 in accordance with the first example technique, in which a MSB-first addition is performed by adding a digital pixel image signal $DN_{sig}$ and the two's complement of the corresponding digital pixel reset signal $DN_{rst}$. During the first period, processed data in the column arithmetic memory (i.e., a digital difference signal for a first pixel) is sent to the line memory for column scanning. The Control_b signal is set to a logical "1" because no test data being provided to the arithmetic memory. The Control_a signal is set to a logical "0", so that the digital difference signal is fed back to an input of the arithmetic memory. The AddnSub control signal and the MSB_INDEX signal are each set to a logical "0" for illustrative purposes.

During the second period, the arithmetic memory generates the two's complement of the digital pixel reset signal $DN_{rst}$. The Control_b signal remains a logical "1" to enable the digital pixel reset signal $DN_{rst}$ to be processed by the arithmetic memory. The Control_a signal remains a logical "0" to enable the digital pixel reset signal $DN_{rst}$ to be subtracted from the null signal, thereby generating the two's complement of the digital pixel reset signal $DN_{rst}$. The AddnSub control signal is set to a logical "0" to indicate that a subtraction operation is being performed (i.e., $0-DN_{rst}$). The MSB_INDEX signal is set to a logical "1" for all unit cells of the arithmetic memory other than the most-significant-bit (MSB) unit cell.

During the third period, the arithmetic memory adds the digital pixel image signal $DN_{sig}$ to the two's complement of the digital pixel reset signal $DN_{rst}$ to provide the digital difference signal. The Control_b signal remains a logical "1" to enable the digital pixel image signal $DN_{sig}$ to be processed by the arithmetic memory. The Control_a signal is set to a logical "1" to enable the digital pixel image signal $DN_{sig}$ to be added to the digital pixel reset signal $DN_{rst}$, thereby generating the digital difference signal. The AddnSub control signal is set to a logical "1" to indicate that an addition operation is being performed (i.e., $DN_{sig}$+two's complement of $DN_{rst}$). The MSB_INDEX signal is set to a logical "1" for all unit cells of the arithmetic memory other than the most-significant-bit (MSB) unit cell.

Figure 14:
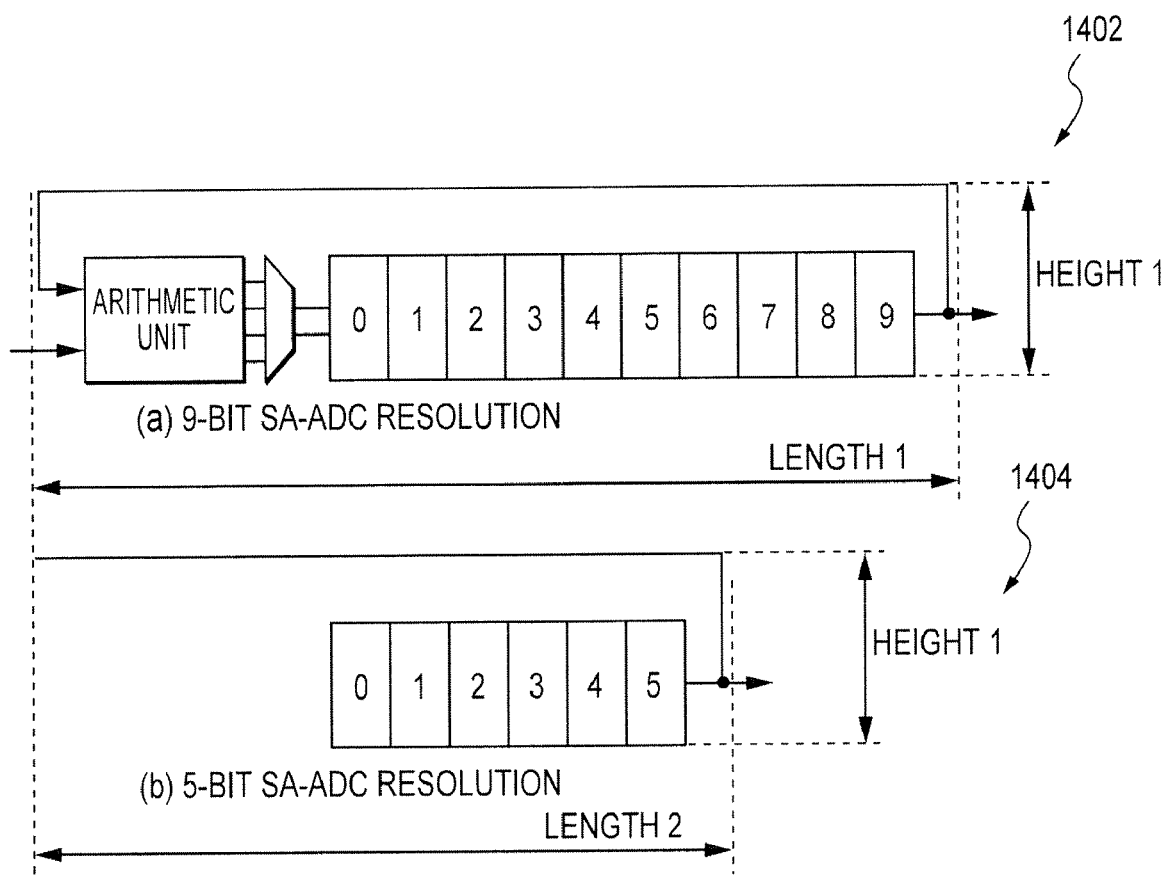
FIG. 14 illustrates bit-resolution flexibility of an example arithmetic memory in accordance with an embodiment disclosed herein.

FIG. 14 illustrates bit-resolution flexibility of an example arithmetic memory in accordance with an embodiment disclosed herein. In FIG. 14, the number of unit cells in an arithmetic memory is scalable to the successive approximation analog-to-digital converter bit resolution. As the bit resolution of the successive approximation analog-to-digital converter increases, the number of unit cells in the arithmetic memory increases, causing an increase in the length of the arithmetic memory. For instance, unit cells may be serially connected along the length of the arithmetic memory. However, the height of the arithmetic memory need not change in response to the increased bit resolution. For example, configuration 1402 shows an arithmetic memory corresponding to a successive approximation analog-to-digital converter resolution of 9 bits and having a length (LENGTH1) and a height (HEIGHT1). Configuration 1404 shows that the length (LENGTH2) of the arithmetic memory corresponding to a successive approximation analog-to-digital converter resolution of 5 bits is less than the length, LENGTH1, of the arithmetic memory in configuration 1402. However, the arithmetic memory in illustration 1404 is shown to have the same height, HEIGHT1, as the arithmetic memory of illustration 1402. The height of the arithmetic memory layout is independent of the successive approximation analog-to-digital converter and is not a limiting factor of the pixel pitch of the pixel array.

Figure 15:
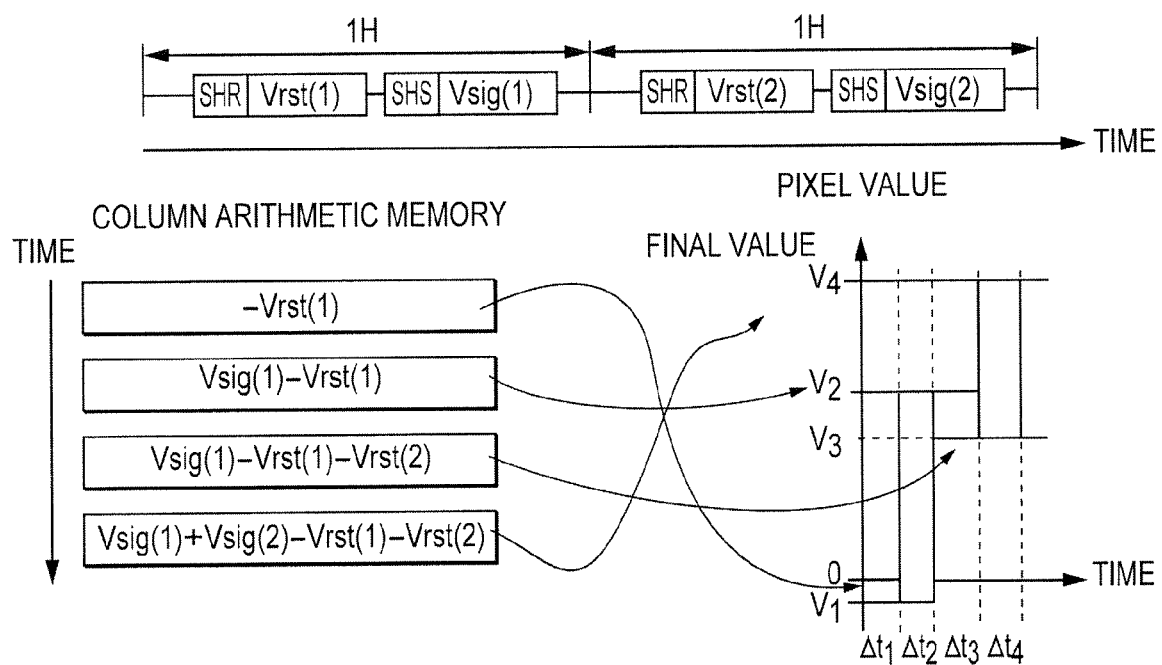
FIG. 15 illustrates vertical binning using column arithmetic memory in accordance with an embodiment described herein.

FIG. 15 illustrates vertical binning using column arithmetic memory in accordance with an embodiment described herein. Vertical binning involves sampling pixel information (i.e., pixel reset and image signals) for n pixels in a column, resulting in one pixel value for n pixels in the vertical direction. In FIG. 15, pixel reset and image signals are sampled for two pixels in a column, resulting in one pixel value for the two pixels in the vertical direction. First, the pixel reset signal $V_{rst}(1)$ of the first pixel is sampled. The arithmetic memory generates and stores the two's complement of $V_{rst}(1)$, represented as $V_1 = -V_{rst}(1)$ in FIG. 15, during $\Delta t_1$ in accordance with the first example technique. The pixel image signal $V_{sig}(1)$ of the first pixel is then sampled. The arithmetic memory adds $V_{sig}(1)$ to $-V_{rst}(1)$ and stores the resulting value $V_2 = V_{sig}(1) - V_{rst}(1)$ during $\Delta t_2$, as shown in FIG. 15. The pixel reset signal $V_{rst}(2)$ of the second pixel is sampled. The arithmetic memory generates the two's complement of $V_{rst}(2)$, represented as $-V_{rst}(2)$ in FIG. 15. The arithmetic memory then adds $-V_{rst}(2)$ to $V_2$ and stores the resulting value $V_3 = V_{sig}(1) - V_{rst}(1) - V_{rst}(2)$ during $\Delta t_3$, as shown in FIG. 15. The pixel image signal $V_{sig}(2)$ of the second pixel is then sampled. The arithmetic memory adds $V_{sig}(2)$ to $V_3$ and stores the resulting value $V_{sig}(1) + V_{sig}(2) - V_{rst}(1) - V_{rst}(2)$ during $\Delta t_4$, as shown in FIG. 15. Analog pixel reset and image signals are shown in FIG. 15 for illustrative purposes and are not intended to be limiting. For instance, vertical binning may be achieved using digital pixel reset and image signals, $DN_{rst}$ and $DN_{sig}$ respectively, in accordance with embodiments described herein.

Vertical binning may be used in any of a variety of applications, including but not limited to the video mode of a digital single-lens reflex (DSLR) camera. For example, during the video mode, a CMOS imager needs to maintain a threshold frame rate, such as 30 fps for the HD 1080p video format. To achieve the threshold frame rate, a frame time can be shortened by reducing the number of rows to output from the CMOS imager during the frame time by row binning or skipping one or more rows (e.g., every other row). Image quality (e.g., spatial aliasing) resulting from row binning is superior to image quality resulting from skipping rows. Accordingly, vertical binning may be performed to increase the frame rate while maintaining image quality.

The embodiments described herein provide a variety of benefits as compared to conventional correlated double sampling techniques. For example, subtraction may be performed for the digital correlated double sampling operation in the column memory for a successive approximation analog-to-digital converter type CMOS imager. The successive approximation analog-to-digital converter bit resolution may be flexible. Fully digital vertical binning may be performed within the column memory without the need for additional circuitry. The dark detail information may be saved after the digital correlated double sampling operation by using the sign bit. Fast row-wise offset correction may be achieved by using the test data loading mechanism. Arithmetic memory circuitry may be configured to fit within a pitch of two columns.

Figure 17:
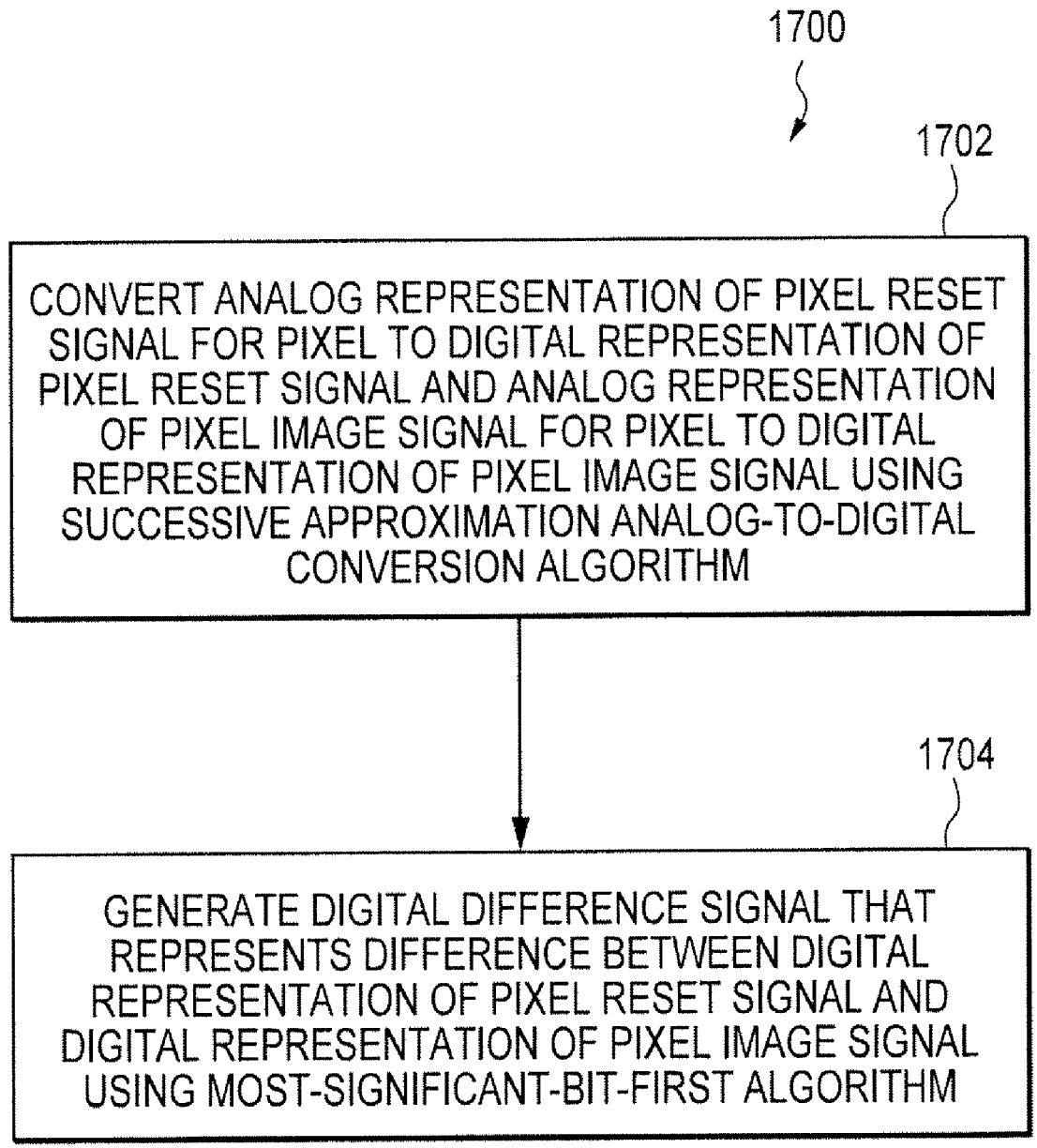
FIG. 17 is a flowchart of a method of performing a digital correlated double sampling operation in accordance with an embodiment disclosed herein.

FIG. 17 is a flowchart of a method 1700 of performing a digital correlated double sampling operation in accordance with an embodiment disclosed herein. The embodiments described herein, however, are not limited to the description provided by the flowchart. Rather, it will be apparent to persons skilled in the relevant art(s) from the teachings provided herein that other functional flows are within the scope and spirit of the embodiments.

Method 1700 will be described with continued reference to imager 100 and components thereof described above in reference to FIGS. 1-3, 6-12, and 14, though the method 1700 is not limited to those embodiments.

Referring now to FIG. 17, an analog representation of a pixel reset signal $V_{rst}$ is converted to a digital representation of the pixel reset signal $DN_{rst}$ and an analog representation of a pixel image signal $V_{sig}$ is converted to a digital representation of the pixel image signal $DN_{sig}$ at step 1702. For example, a successive approximation analog-to-digital converter (SA-ADC) in successive approximation analog-to-digital converter module 118 may convert the analog representations to the respective digital representations. At step 1704, a digital difference signal that represents the difference between the digital representation of the pixel reset signal $DN_{rst}$ and the digital representation of the pixel image signal $DN_{sig}$ is generated using a most-significant-bit-first (MSB-first) algorithm. For example, arithmetic memory 600, 600', or 600" may generate the digital difference signal using the MSB-first algorithm.

Figure 18:
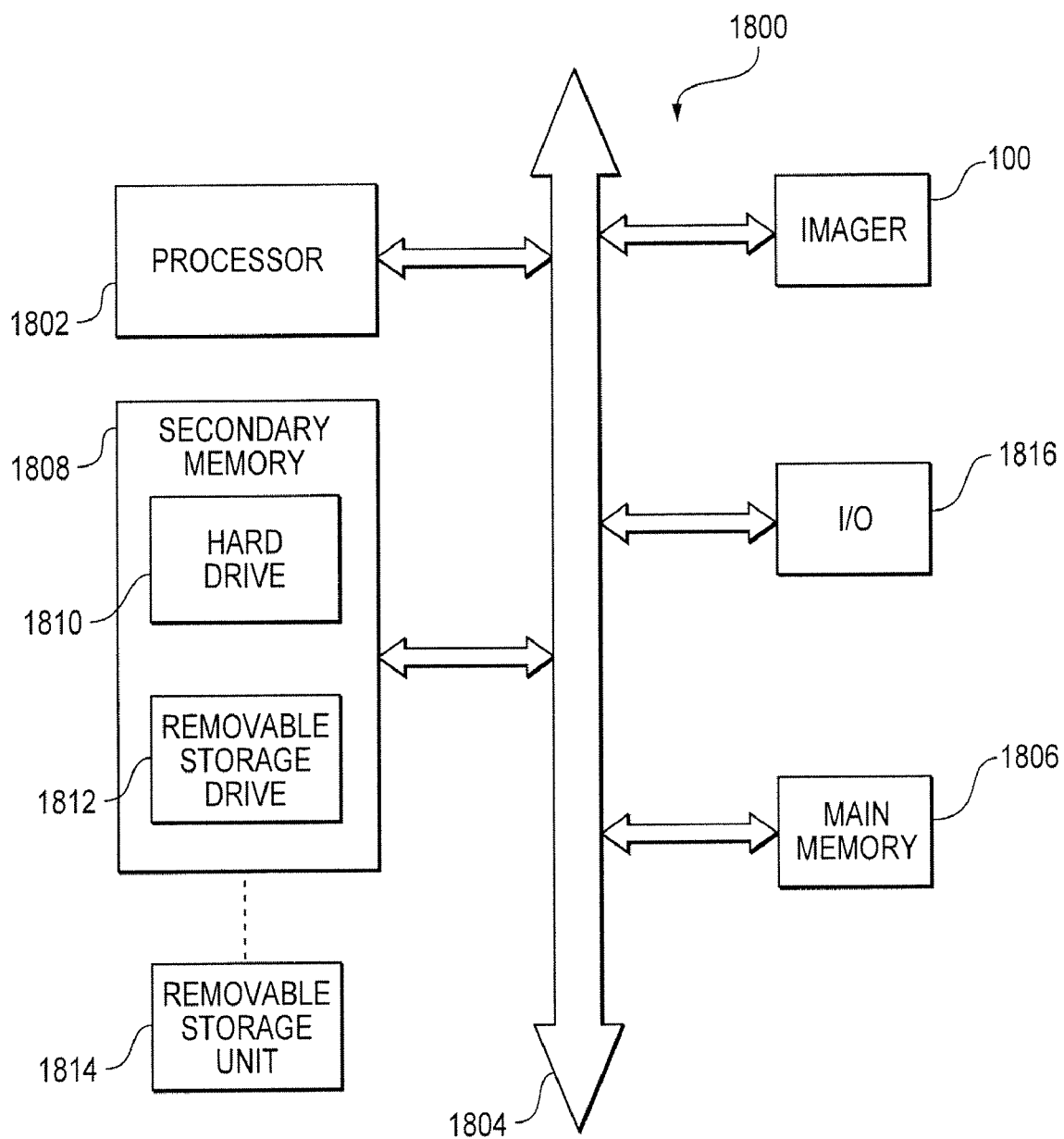
FIG. 18 is an example processor system that includes an imager in accordance with an embodiment disclosed herein.

FIG. 18 is a block diagram of an example processor system 1800 that includes an imager, such as imager 100 of FIG. 1, in accordance with an embodiment disclosed herein. Processor system 1800 will be described with reference to imager 100 for convenience. Processor system 1800 is capable of performing digital correlated double sampling processing using successive approximation analog-to-digital conversion techniques, as described herein. For example, the processing may be performed exclusively by imager 100 or may be shared among imager 100 and other components of processor system 1800. Without being limiting, processor system 1800 may include a computer system, camera system, scanner, machine vision, vehicle navigation, video phone, surveillance system, auto focus system, star tracker system, motion detection system, image stabilization system, data compression system, etc.

Referring to FIG. 18, imager 100 provides an image from a pixel array. Processor system 1800 includes one or more processors, such as processor 1802, which are capable of processing the image. Processor 1802 may be any type of processor, including but not limited to a special purpose or a general purpose digital signal processor. Processor system 1800 also includes a main memory 1806, preferably random access memory (RAM), and may also include a secondary memory 1808. Secondary memory 1808 may include, for example, a hard disk drive 1810 and/or a removable storage drive 1812, representing a floppy disk drive, a magnetic tape drive, an optical disk drive, etc. Removable storage drive 1812 reads from and/or writes to a removable storage unit 1814 in a well known manner. Removable storage unit 1214 represents a floppy disk, magnetic tape, optical disk, etc. As will be appreciated, removable storage unit 1814 includes a computer usable storage medium having stored therein computer software and/or data.

Communication infrastructure 1804 (e.g., a bus or a network) facilitates communication among the components of processor system 1800. For example, imager 100, input/output (I/O) device 1816, main memory 1806, and/or secondary memory 1808 may communicate with processor 1802 or with each other via communication infrastructure 1804.

Processor system 1800 may further include a display interface, which forwards graphics, text, and/or other data from communication infrastructure 1804 (or from a frame buffer not shown) for display on a display unit.

According to the embodiments described herein, imager 100 may be combined with a processor, such as a CPU, digital signal processor, or microprocessor, with or without memory storage on a single integrated circuit or on a different chip than the processor.

It will be recognized by persons skilled in the relevant art(s) that the preferred color reproduction techniques described herein may be implemented as control logic in hardware, firmware, or software or any combination thereof.

Figure 19:
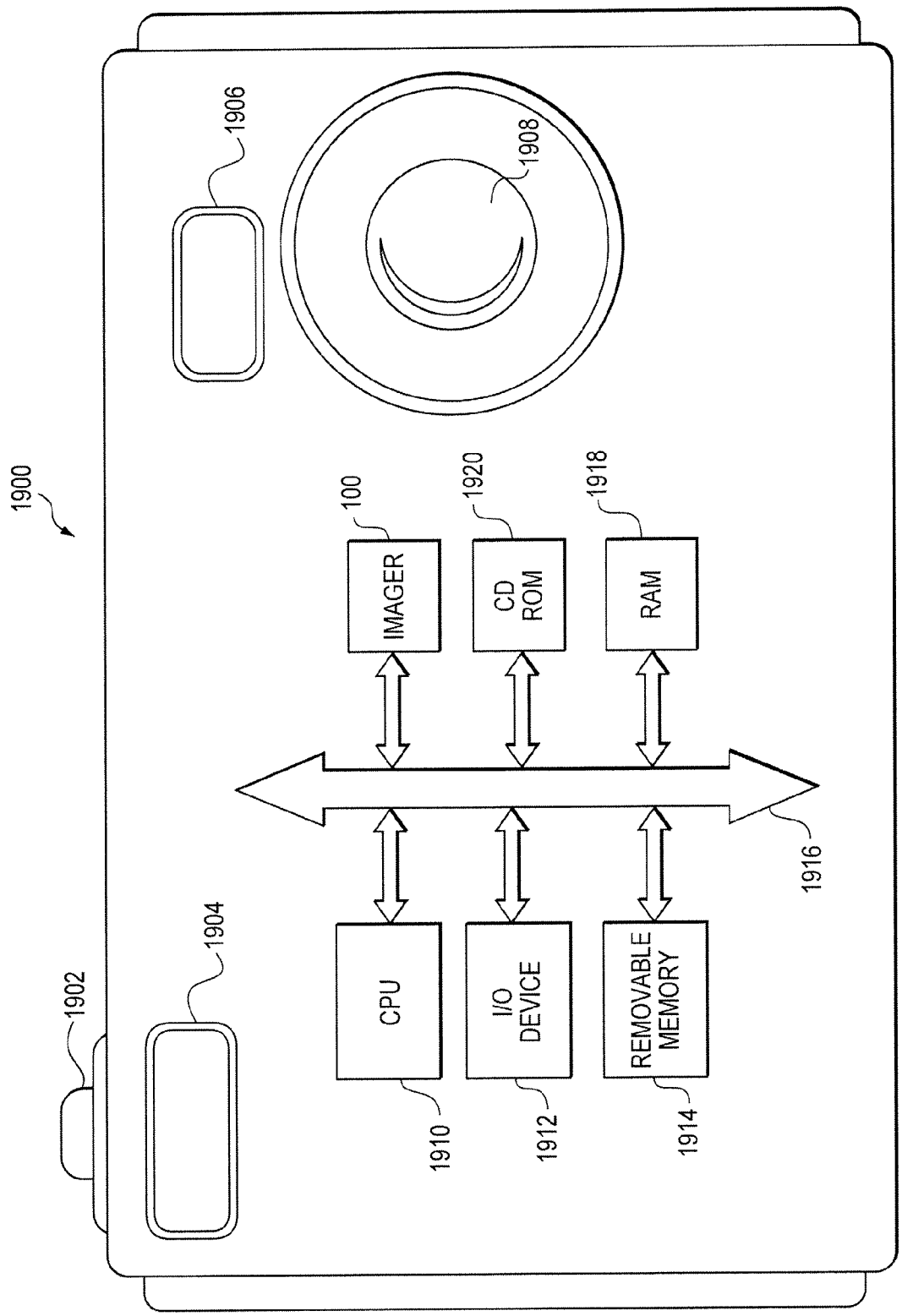
FIG. 19 is a block diagram of an image processing system, incorporating an imager in accordance with the method and apparatus embodiments described herein.

FIG. 19 is a block diagram of an image processing system, e.g., a camera system, 1900 incorporating an imager 100 in accordance with the method and apparatus embodiments described herein. In FIG. 19, imager 100 provides an image output signal as described above. A camera system 1900 generally includes a shutter release button 1902, a view finder 1904, a flash 1906 and a lens system 1908. A camera system 1300 generally also includes a camera control central processing unit (CPU) 1910, for example, a microprocessor, that communicates with one or more input/output (I/O) devices 1912 over a bus 1916. CPU 1910 also exchanges data with random access memory (RAM) 1918 over bus 1916, typically through a memory controller. A camera system may also include peripheral devices such as a removable flash memory 1920, which also communicates with CPU 1910 over bus 1916.

Example embodiments of methods, systems, and components thereof have been described herein. As noted elsewhere, these example embodiments have been described for illustrative purposes only, and are not limiting. Other embodiments and modifications, though presently unforeseeable, of the embodiments described herein are possible and are covered by the invention. Such other embodiments and modifications will be apparent to persons skilled in the relevant art(s) based on the teachings contained herein. Thus, the breadth and scope of the present invention should not be limited by any of the above described exemplary embodiments, but should be defined only in accordance with the following claims and their equivalents.

The invention claimed is:

1. An imager comprising:
   a pixel array including a first pixel that provides a pixel reset signal and a pixel image signal based on photons incident on the first pixel; and
   a digital correlated double sampling module coupled to the pixel array, said digital correlated double sampling module comprising:
   a successive approximation analog-to-digital conversion module to convert an analog representation of the pixel reset signal for the first pixel to a digital representation of the pixel reset signal and to convert an analog representation of the pixel image signal for the first pixel to a digital representation of the pixel image signal; and
   an arithmetic memory module to perform a most-significant-bit-first calculation to generate a digital difference signal that represents a difference between the digital representation of the pixel reset signal and the digital representation of the pixel image signal.

2. The imager of claim 1, wherein the arithmetic memory module is configured to generate a two's complement of the digital representation of the pixel reset signal, and wherein the arithmetic memory module is further configured to perform a most-significant-bit-first addition of the digital representation of the pixel image signal and the two's complement of the digital representation of the pixel reset signal to generate the digital difference signal.

3. The imager of claim 1, wherein the arithmetic memory module is configured to perform a most-significant-bit-first subtraction of the digital representation of the pixel image signal from the digital representation of the pixel reset signal to facilitate generation of the digital difference signal.

4. The imager of claim 1, wherein the arithmetic memory module includes:
   an arithmetic unit to perform a first plurality of bitwise logical operations including:
   a bitwise logical AND operation based on corresponding bits of the digital representation of the pixel reset signal and the inverse of the digital representation of the pixel image signal to provide a first subtraction signal,
   a bitwise logical AND operation based on corresponding bits of the digital representation of the pixel image signal and the inverse of the digital representation of the pixel reset signal to provide a first borrow signal,
   a bitwise logical OR operation based on corresponding bits of the digital representation of the pixel reset signal and the digital representation of the pixel image signal to provide a first addition signal, and
   a bitwise logical AND operation based on corresponding bits of the digital representation of the pixel reset signal and the digital representation of the pixel image signal to provide a first carry signal; and
   a multiplexer controllable by a control signal having a first state that indicates a subtraction operation or a second state that indicates an addition operation, wherein the multiplexer is configured to provide the first subtraction signal and the first borrow signal in response to the control signal having the first state, and wherein the multiplexer is further configured to provide the first addition signal and the first carry signal in response to the control signal having the second state.

5. The imager of claim 4, further comprising:
a least-significant-bit unit cell to store a least-significant bit of the digital difference signal; and
a plurality of normal unit cells coupled in series between the least-significant-bit unit cell and an output node of the arithmetic memory module to store remaining consecutive bits of the digital difference signal;
wherein a feedback is coupled between the output node of the arithmetic memory module and an input of the arithmetic unit;
wherein the least-significant-bit unit cell is configured to perform a second plurality of bitwise logical operations in response to the control signal having the first state, the second plurality of bitwise logical operations including:
a bitwise logical OR operation based on corresponding bits of the first subtraction signal and the first borrow signal to provide a second subtraction signal, and
a bitwise logical AND operation based on corresponding bits of the first borrow signal and a most-significant-bit indication signal to provide a second borrow signal; and
wherein the least-significant-bit unit cell is configured to perform a third plurality of bitwise logical operations in response to the control signal having the second state, the third plurality of bitwise logical operations including:
a bitwise logical AND operation based on corresponding bits of the first addition signal and an inverse of the first carry signal to provide a second addition signal, and
a bitwise logical AND operation based on corresponding bits of the first carry signal and the most-significant-bit indication signal to provide a second carry signal.

6. The imager of claim 5, wherein each of the normal unit cells is configured to perform a fourth plurality of bitwise logical operations in response to the control signal having the first state, the fourth plurality of bitwise logical operations including:
a bitwise logical EXCLUSIVE OR operation based on corresponding bits of a subtraction signal of an adjacent preceding unit cell and a borrow signal of the adjacent preceding unit cell to provide a respective subtraction signal, and
a bitwise logical AND operation based on corresponding bits of the borrow signal of a preceding unit cell and an inverse of a subtraction signal of the preceding unit cell to provide a respective borrow signal; and
wherein each of the normal unit cells is configured to perform a fifth plurality of bitwise logical operations in response to the control signal having the second state, the fifth plurality of bitwise logical operations including:
a bitwise logical EXCLUSIVE OR operation based on corresponding bits of an addition signal of an adjacent preceding unit cell and a carry signal of the adjacent preceding unit cell to provide a respective addition signal, and
a bitwise logical AND operation based on corresponding bits of the addition signal of the preceding unit cell and the carry signal of the preceding unit cell to provide a respective carry signal.

7. The imager of claim 1, wherein the arithmetic memory module is configured to perform a vertical binning operation to generate the digital difference signal.

8. The imager of claim 1, wherein the arithmetic memory module is configured to add an offset to each bit of the digital difference signal.

9. The imager of claim 1, wherein the arithmetic memory module is configured to calculate an average optical black value based on a plurality of optical black signals received from the successive approximation analog-to-digital conversion module, and wherein the arithmetic memory module is further configured to subtract the average optical black value from each bit of the digital difference signal.

10. A semiconductor chip comprising:
a pixel array including a first pixel that provides a pixel reset signal and a pixel image signal based on photons incident on the first pixel; and
a digital correlated double sampling module coupled to the pixel array, said digital correlated double sampling module comprising:
a successive approximation analog-to-digital conversion module to convert an analog representation of the pixel reset signal for the first pixel to a digital representation of the pixel reset signal and to convert an analog representation of the pixel image signal for the first pixel to a digital representation of the pixel image signal, and
an arithmetic memory module to perform a most-significant-bit-first calculation to generate a digital difference signal that represents a difference between the digital representation of the pixel reset signal and the digital representation of the pixel image signal;
wherein the pixel array includes n columns of pixels, wherein the successive approximation analog-to-digital conversion module includes $$\frac{n}{m}$$

successive approximation analog-to-digital converters, wherein the arithmetic memory module includes $$\frac{n}{m}$$

arithmetic memories, wherein n and m are integers, and wherein n≧m.

11. The semiconductor chip of claim 10, wherein the $$\frac{n}{m}$$

successive approximation analog-to-digital converters include a first set of successive approximation analog-to-digital converters and a second set of successive approximation analog-to-digital converters, wherein the successive approximation analog-to-digital conversion module includes the first set along a first side of the pixel array and the second set along a second side of the pixel array.

12. The semiconductor chip of claim 11, wherein each of the first and second sets of successive approximation analog-to-digital converters includes $$\frac{n}{2m}$$

successive approximation analog-to-digital converters.

13. The semiconductor chip of claim 10, having first and second opposing edges that define a plane;
   wherein the arithmetic memory module includes a plurality of unit cells coupled in series along a first axis to store respective bits of the digital difference signal;
   wherein a height of the plurality of unit cells is defined along a second axis that is perpendicular to the first axis;
   wherein the height is independent of a number of unit cells in the plurality of unit cells; and
   wherein the first and second axes are in the plane.

14. A method of performing a digital correlated double sampling operation in an imager, comprising:
   converting an analog representation of a pixel reset signal to a digital representation of the pixel reset signal and an analog representation of a pixel image signal to a digital representation of the pixel image signal using a successive approximation analog-to-digital conversion method; and
   generating a digital difference signal that represents the difference between the digital representation of the pixel reset signal and the digital representation of the pixel image signal using a most-significant-bit-first method.

15. The method of claim 14, wherein generating the digital difference signal includes:
   generating a two's complement of the digital representation of the pixel reset signal; and
   performing a most-significant-bit-first addition of the digital representation of the pixel image signal and the two's complement of the digital representation of the pixel reset signal.

16. The method of claim 14, wherein generating the digital difference signal includes:
   performing a most-significant-bit-first subtraction of the digital representation of the pixel image signal from the digital representation of the pixel reset signal.

17. The method of claim 14, wherein generating the digital difference signal includes:
   performing a bitwise logical AND operation based on corresponding bits of the digital representation of the pixel reset signal and the inverse of the digital representation of the pixel image signal to provide a first subtraction signal,
   performing a bitwise logical AND operation based on corresponding bits of the digital representation of the pixel image signal and the inverse of the digital representation of the pixel reset signal to provide a first borrow signal,
   performing a bitwise logical OR operation based on corresponding bits of the digital representation of the pixel reset signal and the digital representation of the pixel image signal to provide a first addition signal, and
   performing a bitwise logical AND operation based on corresponding bits of the digital representation of the pixel reset signal and the digital representation of the pixel image signal to provide a first carry signal; and
   providing the first subtraction signal and the first borrow signal in response to a control signal having a first state indicating a subtraction operation or the first addition signal and the first carry signal in response to the control signal having a second state indicating an addition operation.

18. The method of claim 17, further comprising:
   performing a first plurality of bitwise logical operations in response to the control signal having the first state, the first plurality of operations including:
      performing a bitwise logical OR operation based on corresponding bits of the first subtraction signal and the first borrow signal to provide a second subtraction signal, and
      performing a bitwise logical AND operation based on corresponding bits of the first borrow signal and a most-significant-bit indication signal to provide a second borrow signal; or
   performing a second plurality of bitwise logical operations in response to the control signal having the second state, the second plurality of operations including:
      performing a bitwise logical AND operation based on corresponding bits of the first addition signal and an inverse of the first carry signal to provide a second addition signal, and
      performing a bitwise logical AND operation based on corresponding bits of the first carry signal and the most-significant-bit indication signal to provide a second carry signal.

19. The method of claim 18, further comprising:
   performing a third plurality of bitwise logical operations in response to the control signal having the first state, the third plurality of operations including:
      performing a bitwise logical EXCLUSIVE OR operation based on corresponding bits of a subtraction signal of an adjacent preceding unit cell and a borrow signal of the adjacent preceding unit cell to provide a respective subtraction signal, and
      performing a bitwise logical AND operation based on corresponding bits of the borrow signal of a preceding unit cell and an inverse of a subtraction signal of the preceding unit cell to provide a respective borrow signal; or
   performing a fourth plurality of bitwise logical operations in response to the control signal having the second state, the fourth plurality of operations including:
      performing a bitwise logical EXCLUSIVE OR operation based on corresponding bits of an addition signal of an adjacent preceding unit cell and a carry signal of the adjacent preceding unit cell to provide a respective addition signal, and
      performing a bitwise logical AND operation based on corresponding bits of the addition signal of the preceding unit cell and the carry signal of the preceding unit cell to provide a respective carry signal.

20. The method of claim 14, wherein generating the digital difference signal includes:
   adding digital representations of pixel image signals of the first pixel and at least one additional pixel corresponding to a column of a pixel array; and
   subtracting digital representations of pixel reset signals of the first pixel and the at least one additional pixel from the digital representations of the pixel image signals.

21. The method of claim 14, further comprising:
   adding an offset to each bit of the digital difference signal.

22. The method of claim 14, further comprising:
   calculating an average optical black value based on a plurality of optical black signals received from the successive approximation analog-to-digital conversion module; and
   subtracting the average optical black value from each bit of the digital difference signal.

* * * * *